United States Patent
Provost

Patent Number: 6,131,251
Date of Patent: Oct. 17, 2000

[54] MOLDED HOOK MEMBER FOR A TOUCH FASTENER

[75] Inventor: George A. Provost, Litchfield, N.H.

[73] Assignee: Velcro Industries B.V., Curacao, Netherlands

[21] Appl. No.: 09/167,777

[22] Filed: Oct. 7, 1998

Related U.S. Application Data

[62] Division of application No. 08/659,368, Jun. 6, 1996, Pat. No. 5,900,350.

[51] Int. Cl.[7] .................................................. A44B 18/00
[52] U.S. Cl. ............................................................. 24/452
[58] Field of Search ..................................... 24/442–452

[56] References Cited

U.S. PATENT DOCUMENTS

| | | | |
|---|---|---|---|
| 4,984,339 | 1/1991 | Provost et al. ............................. | 24/452 |
| 5,058,247 | 10/1991 | Thomas et al. . | |
| 5,116,563 | 5/1992 | Thomas et al. . | |
| 5,315,740 | 5/1994 | Provost ..................................... | 24/452 |
| 5,326,612 | 7/1994 | Goulait ................................. | 24/452 X |
| 5,339,499 | 8/1994 | Kennedy et al. . | |
| 5,537,720 | 7/1996 | Takizawa et al. ........................ | 24/452 |
| 5,604,963 | 2/1997 | Akeno ....................................... | 24/452 |
| 5,845,375 | 12/1998 | Miller et al. ............................... | 24/452 |

*Primary Examiner*—James R. Brittain
*Attorney, Agent, or Firm*—Fish & Richardson P.C.

[57] ABSTRACT

A mold for forming hook-shaped members has hook shaped cavities located at its surface. The cavities have a height of 0.020 in. or less, and contiguous pedestal chambers and crook chambers. The pedestal chamber is shaped to allow the member to return to its original shape as it is pulled out of the cavity before it is completely removed from the cavity. A fastener element of a hook and loop fastener is formed by delivering moldable heated material to such a mold.

A method of making surface elements includes delivering moldable resin to the surface of a mold and forcing the resin into cavities at the surface. The mold comprises a series of plates aligned face-to-face. Cut-outs in at least three adjacent plates are aligned to define the cavity. The resin is set in the cavity and removed from the mold.

A method of manufacturing plates used to form fastener elements includes applying a photoresist material to at least one side of the plate. The photoresist material is exposed to light. Portions of the photoresist material are removed based on the light exposure. Acid is applied to the plate, dissolving portions of the plate exposed to the acid and creating cut-outs.

A hook member has an integrally-formed pedestal and crook. In side profile, the pedestal forms a truncated pyramid. Projections of leading and trailing edges of the pedestal intersect near the top of the hook. At least 40% of the crook projects laterally from the pedestal.

43 Claims, 18 Drawing Sheets

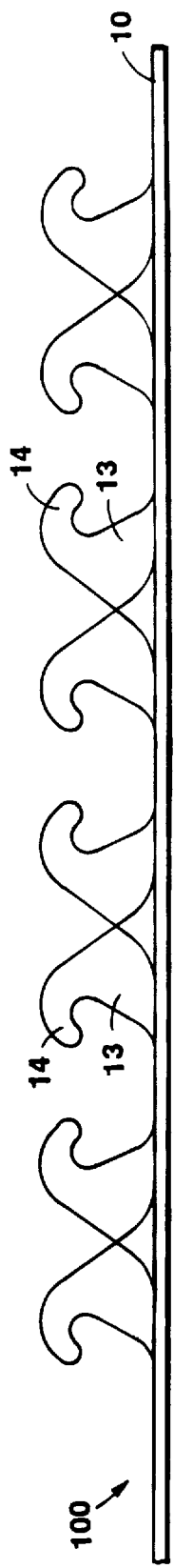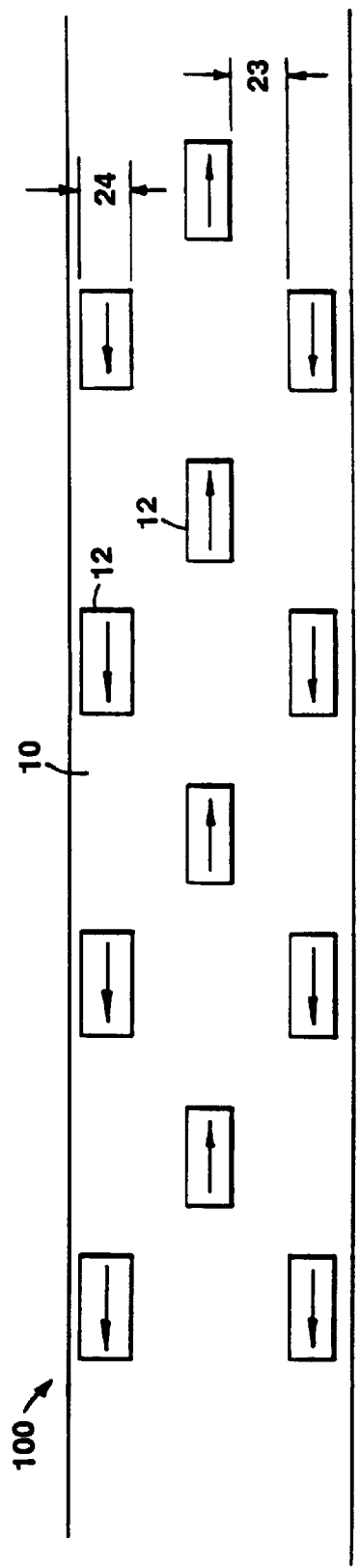

FIG. 2C
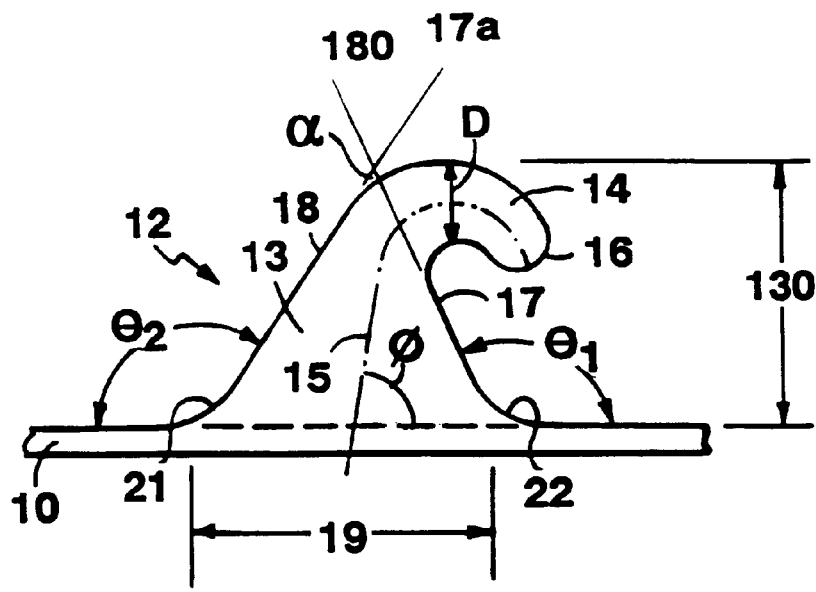
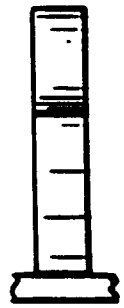
FIG. 2B
FIG. 2A
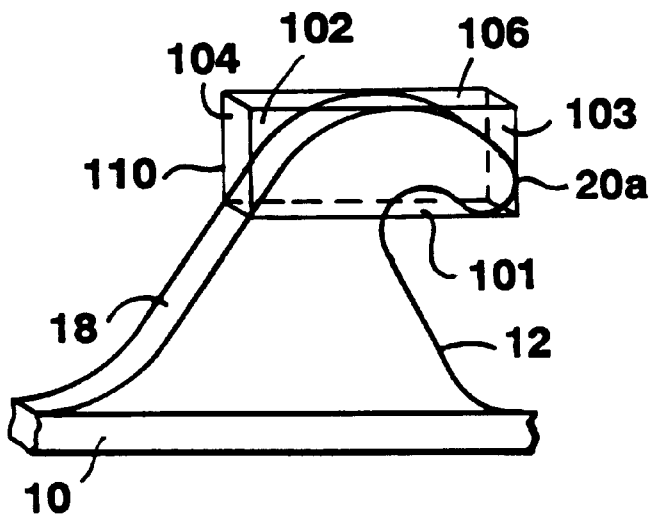
FIG. 2D

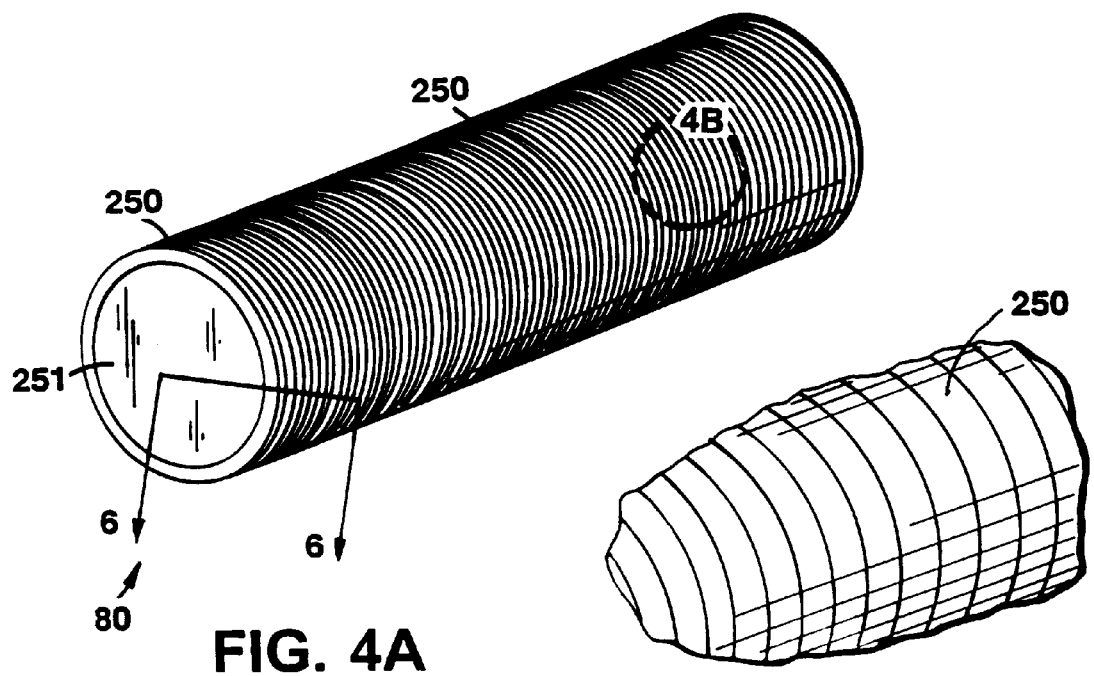
FIG. 4A
FIG. 4B
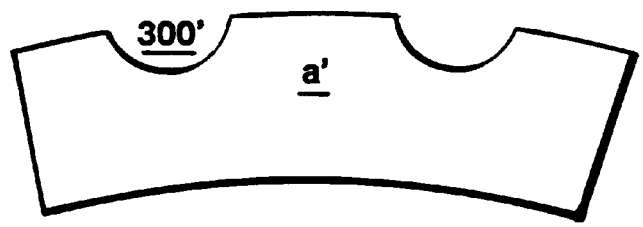
FIG. 8A
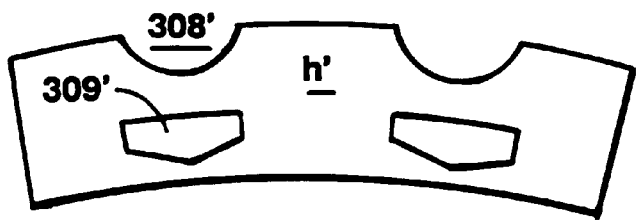
FIG. 8B

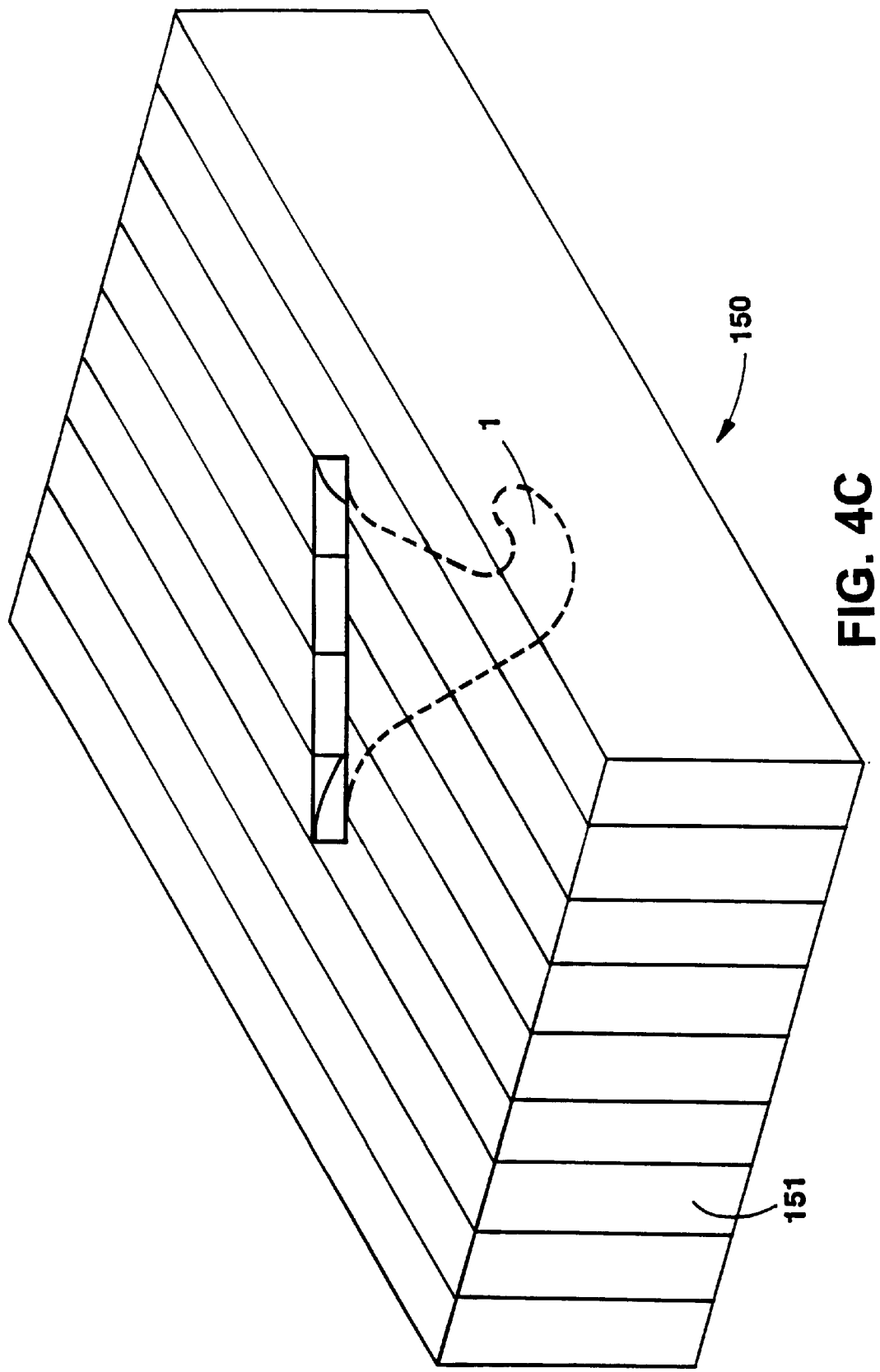

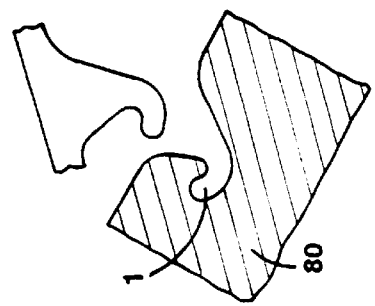
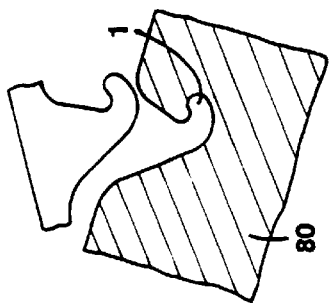
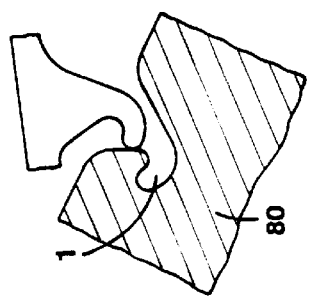
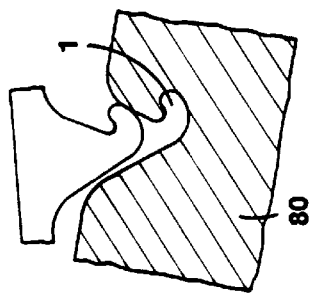
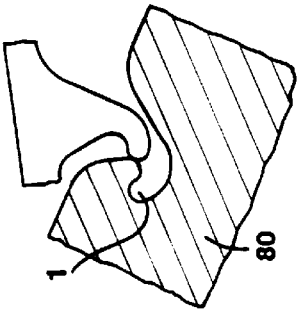
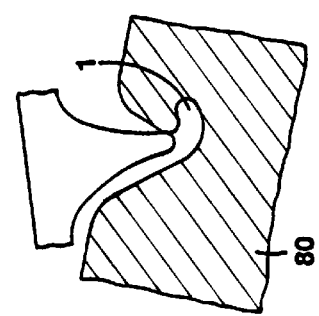
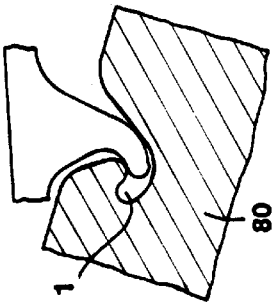
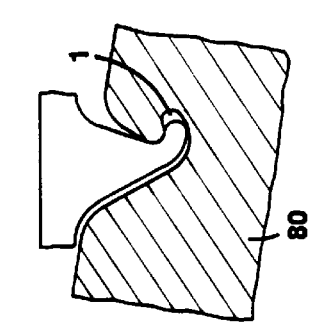
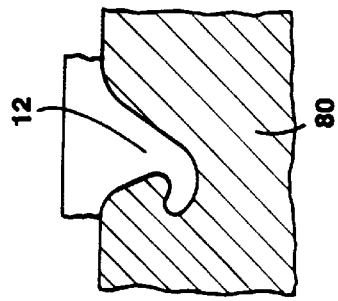
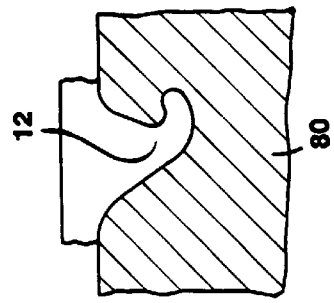
FIG. 5A
FIG. 5B

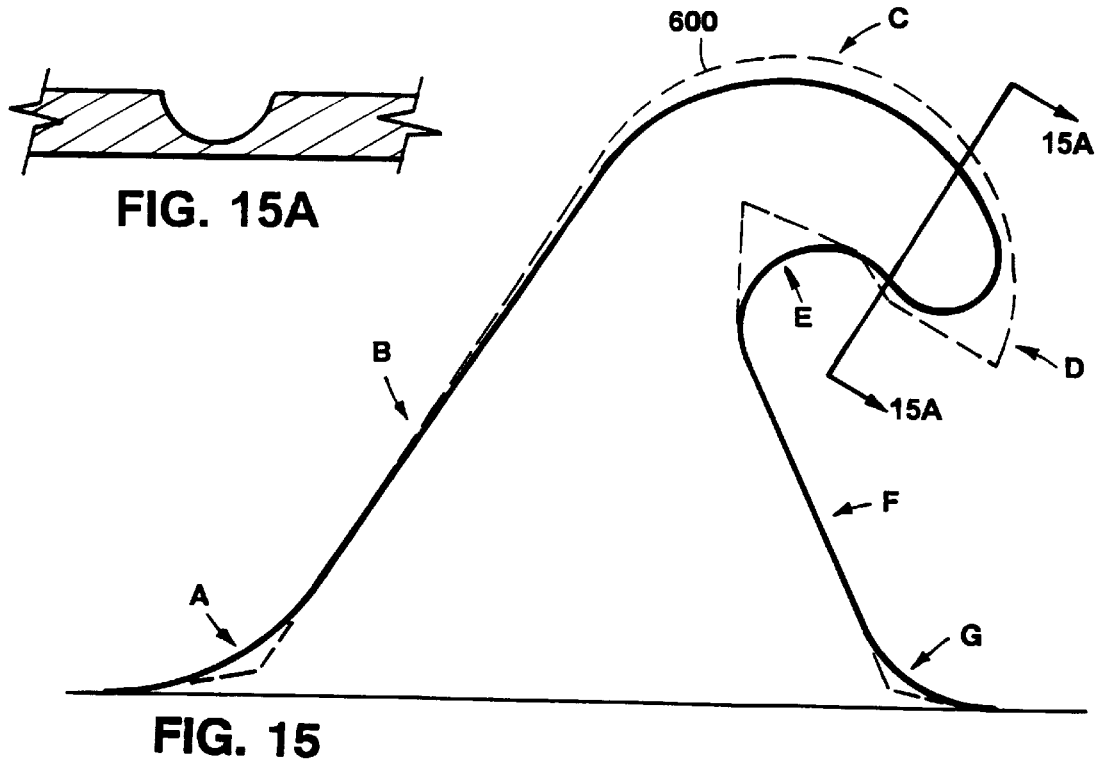
FIG. 15A
FIG. 15
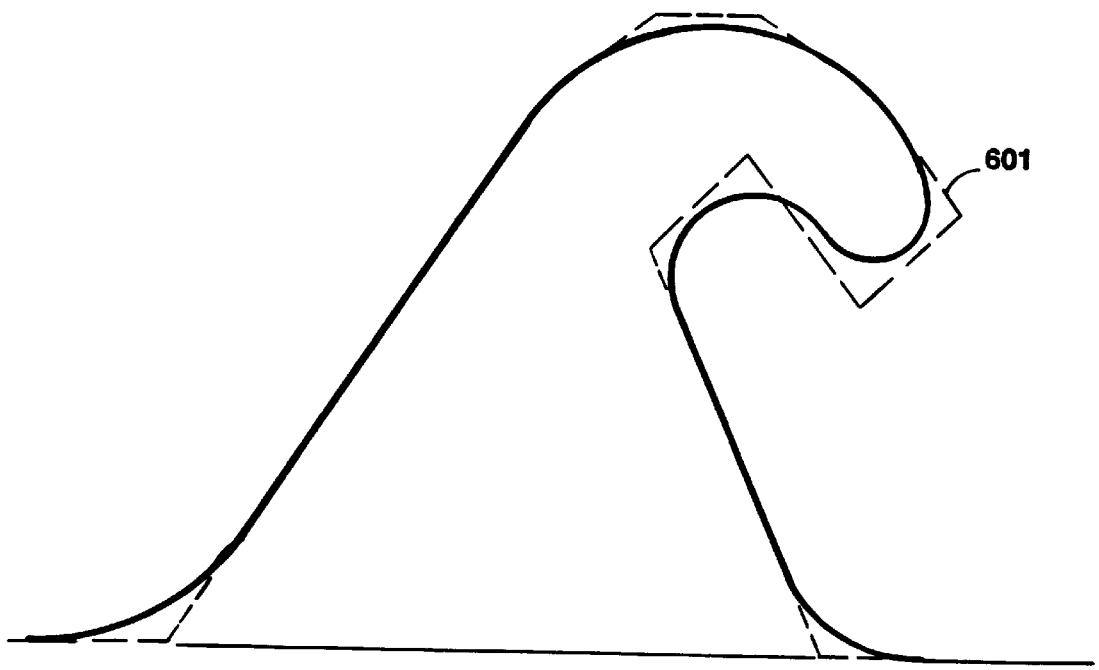
FIG. 16

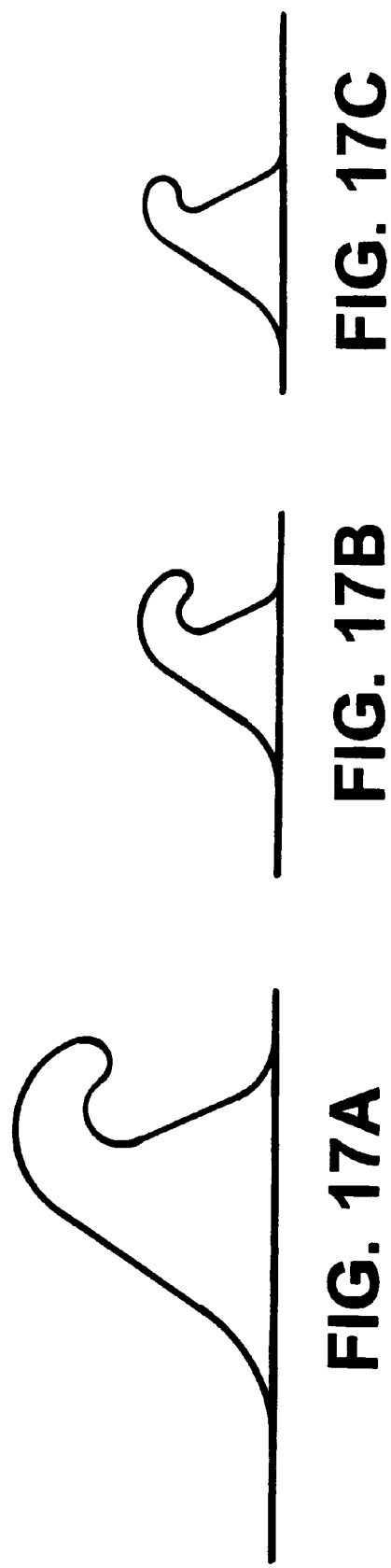

MOLDED HOOK MEMBER FOR A TOUCH FASTENER

This is a divisional of U.S. application Ser. No. 08/659,368, filed Jun. 6, 1996, now U.S. Pat. No. 5,900,350.

This invention relates to molding methods and products and to the making of molded hook fasteners for engaging low loft fabrics.

In the field of molded hook fasteners, typically a series of adjacent rows of hooks forms one side of a fastener and a mating member provides loops or anchored fibers with which the hooks engage.

A fastener element with rows of hook members is typically formed with a molding tool that has no moving parts. The hooks are pulled from their mold cavities by distorting the hooks. For molding continuous strips of such hook members, a rotating molding roll is employed while for discrete items, injection molding techniques are employed. Improvements applicable to such molds and to the processes of molding these hook members may be useful in molding other products.

SUMMARY OF THE INVENTION

It is realized that molded fastener hooks with very small hooks, i.e. of height less than 0.020 in., can provide better engagement with low-lying loops or fibers of inexpensive fabrics because the probability is increased that each hook of a fastener will engage a loop or fiber.

There are a number of seemingly conflicting considerations that stand in the way of realizing this objective in a manner that provides highly effective fastening. As the hook members become smaller and thinner, they become more flexible. This increases the tendency for hooks under slight load to disengage from the mating fabric. It is usually important that such small hook members present a significant re-entrant crook, i.e. a hook tip that tilts downwardly, in order to better snag and retain the loops or fibers of the mating fabric. It also is important that the crook of the hook have a very low displacement volume to enable sufficient penetration into low loft fabrics to enable loop or fiber engagement. Crook displacement volumes, as defined below, of less than $1.0 \times 10^{-6}$ in.$^3$ and preferably about $0.5 \times 10^{-6}$ in.$^3$ or less are desired. It is of course also important that the peel and shear strengths of the overall fastener meet the strength demands of the conditions of use. Consequently, the hooks and the loops must have sufficient strength to maintain engagement but also sufficient flexibility to disengage without destroying the hooks or the loops.

The preferred known technique for making high performance hooks has been to employ molds that have no moving parts, but hooks of the size of interest here are especially difficult to achieve by such conventional techniques.

The present invention provides improved molded hook members and products having such hook members for making the hooks and other products, improved techniques for making the molds.

According to one aspect of the invention we have realized that effective molded hook members of height less than 0.020 in., that have efficient loop or fiber engaging crooks and displacement volumes of less than $1.0 \times 10^{-6}$ in.$^3$ and preferably about $0.5 \times 10^{-6}$ in.$^3$ or less (such hooks are sometimes referred to herein as microhooks), can be reliably produced at high speed and low cost by use of special shape parameters for the mold cavity in which the hook is formed.

A conventional mold cavity defines a hook profile consisting of a relatively short base or pedestal, a relatively elongated stem section, and a crook or return section. We have realized that an effective microhook can instead be formed by use of a mold cavity profile that is defined essentially by a pedestal portion to which a tapered crook portion is directly joined.

In a preferred microhook mold cavity, the base width and taper rate are also important. Preferably, the base is at least about 100% of the overall hook height, more preferably at least about 110% or more. Preferably, the taper (rate of change of width relative to distance along the hook axis) of the hook cavity from its base at least to a level of half of the height of the hook cavity is greater than 0.6 to 1, more preferably greater than 0.8 to 1 and most preferably greater than 1.0 to 1.0.

In preferred profiles of this kind, the pedestal cavity has a much larger taper from its base to the midsection of the hook than the taper of the crook section. A pedestal taper of more than four times and preferably more than five times the taper of the crook portion is employed. In preferred implementations, the sides of the profile of the mold cavity are straight and a projection of the converging sides intersect at an apex angle of 40° or more, preferably, at least 50° and in the presently preferred implementation, 60°.

Such mold constructions produce hooks that are strong for their size and enable a high density of the hooks to be achieved.

Such mold constructions also enable the molded crook portion of the hook, after undergoing deformation during withdrawal from the fixed mold cavity, to be rapidly exposed to an expansion space that quickly gives room for the crook portion to recover toward its originally molded form.

By use of these novel mold cavity parameters, we realize that certain conditions in the molding of microhooks can be overcome. Immediately upon molding in a cooled mold, a hook has a memory for its initial molded condition. After being deformed the crook tends to return to the initial form. However, if a hook member has a significant crook, it cannot be withdrawn from a fixed mold unless it remains warm and readily deformable. To the extent the hook member cools while being withdrawn, a tendency is introduced for the hook to set in the deformed condition, and not return sufficiently to the designed crook shape.

These factors have been present in the molding of hook members of larger form, but have not appeared critical.

We realize, however, that with microhooks, these factors can be more critical: because the very small crook tips have a significantly increased ratio of exposed cooling surface relative to mass, the fabric-engaging crooks tend to cool and set more quickly than do molded hook elements of the conventional larger form. With the novel mold cavity parameters provided by the present invention, the degree of setting in deformed state can be decreased because the relative duration of exposure of the hook member to the deformed condition is decreased. This enables effective production of microhooks having a high level of performance.

We have realized that products made with the mold profile and techniques just described have other advantages, even where rapid recovery of the hook tip shape is not important. The wide based pedestal to which the crook is directly attached provides a profile with considerable strength in shear loading. Accordingly, the cross-row thickness of the hook can be less than the conventional thickness of 0.008 in. or more; preferably the hook has a thickness of 0.006 in. or less. Likewise the spacing between adjacent rows of hooks can be less than about 0.010 in., preferably about 0.008 in. or less. Density of distribution of the hooks in the direction cross-wise to the direction of the rows of hooks of about 50 per in. or more can be advantageously achieved, preferably about 70 hooks per in. or more.

The smallness of the hooks also enables densities of distribution in the direction of the rows of hooks of about 20 hooks per in. or more, preferably about 25 hooks or more per in.

In particular it becomes possible to mold highly effective hook members that have an areal density greater than 1000 hooks per in.$^2$, and preferably greater than 1500 hooks per in.$^2$. Hook members of such areal density and form have been found to have an aggregate strength effect that can meet the strength demands of many conditions of use, while providing a hook surface that is soft to the touch due to the aggregate surface effect provided by the closely adjacent hooks. The preferred downward orientation of the tips add to this effect. Each of these features makes the hook member useful on items that lie close to the skin.

When the molds are provided on a rotating molding roll, the mold profile of the invention enables particularly efficient production of running lengths of many closely spaced rows of high performance hook member. The invention is also useful for fixed molds for use in injection molding.

Microhooks molds can advantageously be formed by use of EDM techniques. Though etching was previously tried and discarded in this field, it is seen that photochemical milling techniques have unique advantages to the formation of molds for microhooks. They enable the production of hooks that are extremely small (less than 0.010 in. in height), so small that we term them "sub-microhooks". Furthermore, these techniques provide very smooth surfaces for the mold cavities. These have special usefulness to produce hooks for use with extremely low loft materials. In certain circumstances laser machining and laser milling and use of plating techniques also have advantage in the forming of the molds for the unique products of the invention.

The invention also provides techniques for molding hook members that are oriented at various angles to the machine direction of a molding roller or of molds formed by face-to-face assembly of the molding plates. For this purpose apertures in a number of thin plates cooperate to define the mold cavity.

According to one aspect of the invention, a molded hook fastener element of a hook and loop touch fastener capable of engaging low-lying loops of knitted material, or fibers of non-woven material and the like of a mating fabric, is provided. The hook fastener element is formed by delivering a moldable, heated material to a mold, the mold having a multiplicity of hook-shaped mold cavities arranged in an array. Each hook-shaped cavity has a curved axis, a tapered pedestal chamber and a tapered crook chamber. The pedestal chamber and the crook chamber are contiguous and integrally formed. The pedestal chamber has a leading edge and a trailing edge that slope inwardly toward each other at similar angles to the mold surface to define a truncated, broad-based pyramid when viewed in side profile with a pedestal chamber base width measured at the mold surface which base width is greater than about the height of the mold cavity. The width of the pedestal chamber at the half height of the mold cavity is equal to about half the hook shaped cavity or more.

Certain implementations of this aspect of the invention have one or more of the following features. The molded hook fastener, in certain implementations, provides: the fastener is formed by extruding the moldable, heated material on the vicinity of the mold; the fastener is formed by pressing the extruded moldable, heated material into the mold cavities with a pressure roller disposed adjacent the mold; the mold is a molding roll and the moldable material is pressed into the hook-shaped cavities by a pressure roller disposed adjacent to the molding roll; the mold is a solid mold and the moldable material is injected directly into the hook-shaped cavities; the pedestal chamber tapers at a taper rate of at least 0.6 to 1 up to at least the half height of the hook shaped cavity; the taper rate is at least 0.8 to 1.0; the hook-shaped cavity has a height less than about 0.015 in.; the hook-shaped cavity has a height of less than about 0.010 in.; the cavity profile defines a hook having a crook portion, at least 40% of the width of the crook portion projecting laterally from the pedestal chamber; the pedestal width that corresponds to the width of the crook portion corresponds with a pedestal height of at least 30% of the total pedestal height above the base.

According to another aspect of the invention, a molded hook member for a touch fastener is provided. The hook member is integrally formed with a sheet-form base in a mold having no moving parts. The molded hook member is capable of engaging low-lying loops of knitted material, or fibers of non-woven material and the like of a mating fabric. A broad-based, tapered pedestal integrally formed with and extending upwardly from the base, and a tapered crook portion integrally formed with and arching along a curved axis directly from the top of the pedestal to a tip that engages said mating fabric. In side profile, the pedestal has upwardly extending leading and trailing edges that slope inwardly toward each other at similar angles to the vertical to define a truncated, broad-based pyramid with a pedestal base width measured at the base. Projections of the leading and trailing edges intersect in the vicinity of the top of the hook, and at least 40% of the crook portion projects laterally from the pedestal.

Certain implementations of this aspect of the invention have one or more of the following features. The molded hook member, in certain implementations, provides: projections of the leading edge and the trailing edge intersect at an angle greater than about 40 degrees; the projections of the leading edge and the trailing edge intersect at an angle greater than about 50 degrees; the taper of the pedestal is at least four times as large as the taper of the crook portion; the hook member has a height less than about 0.020 in., a thickness of about 0.006 in. or less and is disposed on the sheet-form base at a density of at least 1200 molded hook members per square in.

According to another aspect of the invention, a molded hook member for a fastener is provided. The hook member has a tip portion capable of being formed in a cavity of a mold having no moving mold parts, and capable of engaging low-lying loops of knitted material, fibers of nonwoven material, and the like of a mating fabric. A tapered pedestal is integrally formed with and extending upwardly from the base. A tapered crook portion is integrally formed with and arches along a curved axis. The tapered crook portion extends in a crook direction directly from the top of the pedestal to a tip that engages the mating fabric. The profile of the molded hook member has a height less than about 0.020 in. from its base and a pedestal base width of less than about 0.020 in., not counting the fillets. The body of the hook member tapers continuously from the base to its distal tip. The taper of the pedestal is at least 50 degrees. The hook member is thereby shaped so that the cavity in which the hook member is formed provides a space for substantially immediate release for the tip portion of the hook member as it is withdrawn from the mold to enable the crook portion to return substantially to its molded shape after it commences dislodging from the mold but before it is completely removed from the mold.

Certain implementations of the foregoing aspects of the invention have one or more of the following features. The molded hook member, in certain implementations, provides: the displacement volume of the crook portion is less than $0.5 \times 10^{-6}$ in. cubed; the tip is curved down generally in the direction of the base; the pedestal is 0.006 in. thick or less, and in which the hook members have a lineal density of 20 or more members per in. in the crook direction; the hook members have a lineal density of 60 or more members per in. perpendicular to the crook direction.

BRIEF DESCRIPTION OF THE DRAWINGS

FIGS. 2 and 3 are side and top views, respectively, of a hook component.

FIGS. 2a, 2b, 2c and 2d are side, end, top and perspective views, respectively, of a hook member.

FIG. 4a is a perspective view of a mold roll, in isolation.

FIG. 4b is a close-up, section view of the surface of the mold roll.

FIG. 4c is a perspective view of an injection mold showing the orientation of a mold cavity diagrammatically.

FIGS. 5a and 5b are a series of side views showing a hook member being removed from a mold cavity in a mold roll, against and in the machine direction, respectively.

FIGS. 8a and 8b are side views of sections of the plates in FIG. 6, shown diagrammatically, in which the cutouts have curved sides and a wedge is formed at the top of the cavity.

FIGS. 10b and 10c are cross-sectional views of the hook member shown in FIG. 10a.

FIGS. 15 and 16 are diagrammatic views of a mold cavity, and a mask us to form the mold cavity by photochemical milling.

FIG. 15a is a cross-sectional view of a cavity formed by photochemical milling.

FIG. 17a is a side view of a microhook.

FIG. 17b is a side view of a sub-microhook.

FIG. 17c is a side view of a sub-microhook in which the crook extends essentially horizontally.

IMPLEMENTATIONS

Figure 1:
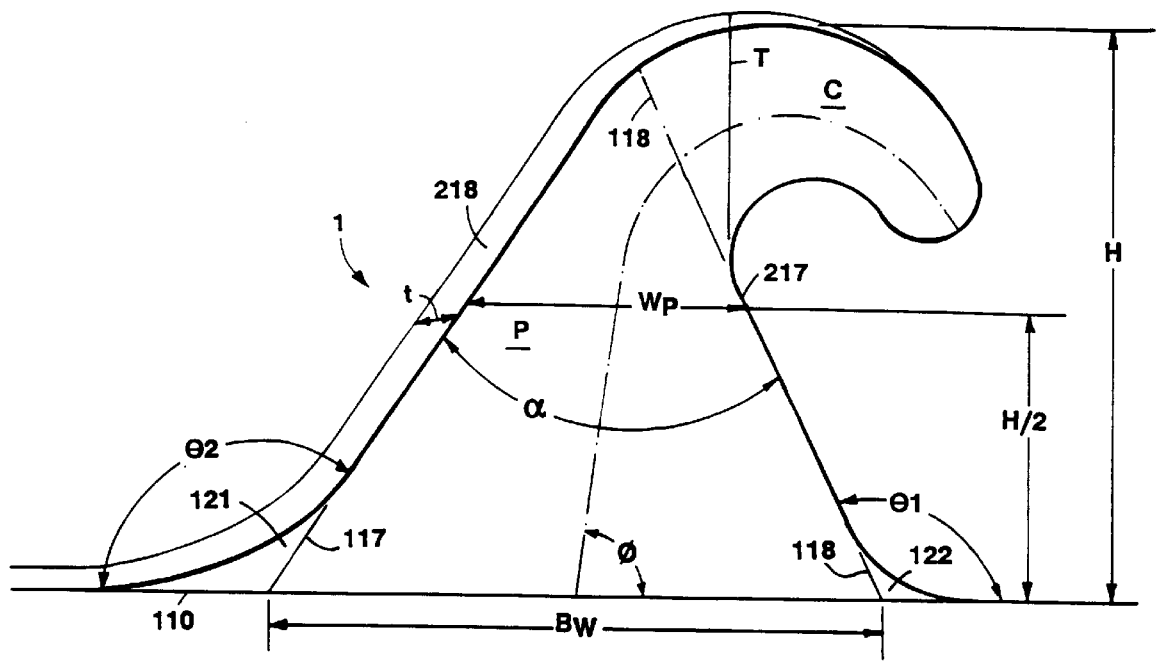
FIGS. 1 and 1a are side views of a mold cavity.
Figure 1A:
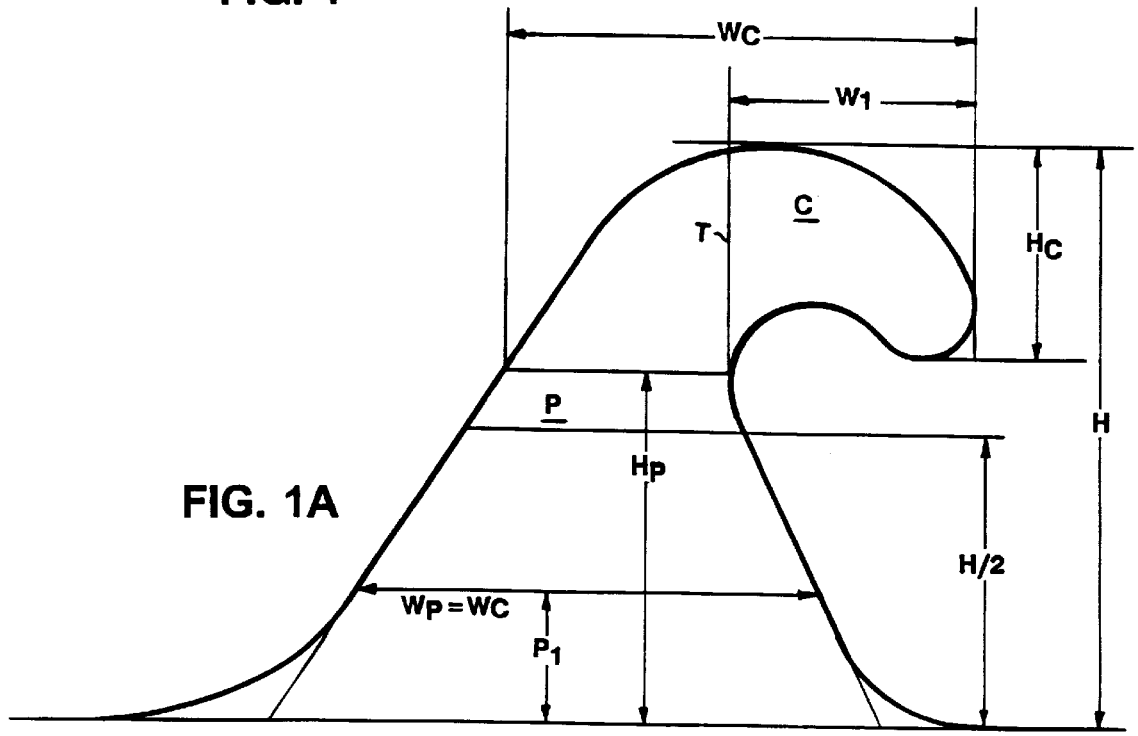

Referring to FIGS. 1 and 1a, the profile of the mold cavity 1 of a preferred implementation of the invention is shown. It defines a pedestal portion or chamber P and a crook portion or chamber C. The pedestal portion has the profile of a broad based triangle, with its relatively straight sides projected to intersect at apex α in the vicinity of the top of the mold cavity. The mold cavity has a total height H and a half height of H/2.

The mold cavity profile of this preferred implementation has a base width $B_w$, measured between intersection of projections 117 and 118 of the sides of the mold cavity with the base surface 110 of the mold, that is greater than about the height H of the hook element; as shown, $B_w$ is about 110% of the height.

At half height (H/2) of the mold cavity, the pedestal portion has a width $W_p$ about equal to the half height of the hook.

With an apex angle α of about 60°, the pedestal portion continuously tapers from the base (ignoring front and back fillets 121 and 122) at a taper rate of about 1.2 to a point above the half height. The inside surface 217 of the mold cavity then begins to curve to define the lower surface of the crook portion, while the back surface 218 of the mold cavity profile proceeds straight for a further distance. The pedestal portion is considered to end where a tangent T to the inside surface 217 is vertical. Referring to FIG. 1a, the pedestal height $H_p$ is greater than the half height of the hook member.

The crook portion of the mold cavity tapers continually to its tip, though at a much lesser rate than the general taper of the pedestal. In the profile of FIG. 1a, the crook portion continues until its tip portion, directed downwardly, reaches the level of the top of the pedestal portion.

A hook component 100 of a touch fastener in accordance with a preferred implementation of the invention is shown in FIGS. 2, 2a, 2b, 2c, 2d and 3. The hook component consists of a sheet form base 10 and multiple parallel rows of integrally molded hook members 12 extending from the base sheet. Ripstop bumps (not shown), i.e. known raised local regions of the base in the spaces between rows of hooks, may be employed either aligned with the hook members or offset from the hook members, depending upon the intended application.

Corresponding terms will be used to describe features of a hook member produced from the mold cavity. A broad-based, tapered pedestal 13 of the hook member is integrally formed with and extends upwardly from the base 10. Preferably, the pedestal has a straight sided pyramidal shape when viewed in side profile (see FIG. 2a). A tapered crook portion 14 is integrally formed with the pedestal. The crook portion arches along a curved axis 15 directly from the top of the pedestal to a tip 16. The tip is adapted to engage a mating fabric.

The width of the crook portion measured perpendicular to its curved axis (e.g., dimension D of FIG. 2a) continuously decreases from the pedestal to the tip.

In this preferred embodiment, the leading and trailing surfaces 17, 18 of the pedestal form angles $\theta_1$ and $\theta_2$ relative to the sheet-form base, respectively, that are substantially greater than ninety degrees. Preferably, $\theta_1$ and $\theta_2$ are between about 110 and 130 degrees. More preferably, $\theta_1$ and $\theta_2$ are about 116 degrees and 125 degrees, respectively.

Preferably, when the leading edge and the trailing edge of the hook profile are projected, they intersect at an angle α of at least about 40°, more preferably about 50°, and most preferably about 60° or more. The axis 15 intersects the base at an angle φ that is preferably greater than 80° and more preferably approximating 90°. Forming the pedestal as a truncated, broad-based pyramid when viewed in side profile such that the edges slant inward toward each other allows the hook members to be removed more easily from the mold cavity 1 because the crook portion 14 can pass more easily through the portion of the mold cavity in which the pedestal was formed i.e., through the pedestal chamber. Furthermore, due to the relatively wide pedestal base width, each hook member is able to withstand relatively high shear loads despite the relative thinness of the hook member, which enables higher cross-row densities of the hook members to be achieved. Furthermore, the relatively wide pedestal allows the hook member to better resist bending, thereby maintaining a better grip on the loops.

For use in important applications for the new hook component in conjunction with non-woven loop members (which may be only 0.001 in. in diameter and 0.0005 to 0.0020 in. high), the hook members are generally quite small. Height 130 of the hook members 12 is preferably less than about 0.020 in., with 0.0150 in. or less being preferred for microhooks. Furthermore, the pedestal base width 19 for hooks of about 0.015 in. height—i.e., the width of the pedestal, taken parallel to the base 10 at the level where the pedestal joins the base, disregarding the fillets 21 and 22—is preferably between about 0.010 in. and about 0.025 in., with about 0.0170 in. presently being most preferred.

Referring to FIG. 2d, the hook member has a displacement volume defined by a parallelepiped 110 having a bottom plane 101, first and second side planes 102, first and second end planes 103,104 and a top plane 106. The bottom plane is oriented parallel to the base and tangent to the tip. The top is parallel to the base and tangent to the top of the hook member at the point where the hook member achieves its maximum distance from the base. The side planes lie in the planes of the sides of the hook. The first end plane 104 is perpendicular to the bottom plane at the point where the bottom plane intersects the hook member at its trailing edge 18. The second end plane 103 is perpendicular to the bottom plane and tangent to the outermost portion of the crook. The mold cavity has a crook height $H_c$, a crook width $W_c$ and a thickness t. The displacement volume DV of the crook portion of the hook member formed in the mold cavity is $DV = W_c \times H_c \times t$. The hook member has a displacement volume of less than $1.0 \times 10^{-6}$ in.$^3$ and preferably about $0.5 \times 10^{-6}$ in.$^3$ or less.

Referring to FIG. 1a, the crook projection, i.e. the distance the crook portion projects laterally from the top of the pedestal is shown as $W_1$, which is greater than 40% of the crook width $W_c$.

This profile is also within the preferred rule that the height $P_1$ of the pedestal, at which the pedestal width $W_p$ is equal to the width $W_c$ of the crook portion, is at a height greater than 30% of the height $H_p$ of the pedestal.

Numerous advantageous implementations of the profile can be employed to realize microhooks of height less than 0.020 in. and displacement volume less than $0.5 \times 10^{-6}$ in.$^3$. In one specific implementation a hook member having an overall height H of 0.015 in. is provided. The width $W_c$ of crook portion is 0.013 in., the height $H_c$ is 0.005 in., the thickness is 0.006 in. and the displacement volume is $0.4 \times 10^{-6}$ in.$^3$.

The fastener element 100 or hook strip, including the hook members, is advantageously formed using the Fischer process, U.S. Pat. No. 4,794,028, fully incorporated herein by reference, in which the mold cavities for rows of hook members are formed in the peripheries of corresponding disk-form mold plates, the plates being stacked alternately with spacer plates that form the flat sides of the hook members, with strengthening formations of bumps formed in the spacer plates that can add strength to the hook strip. In a preferred implementation as shown in FIG. 3, in the machine direction (i.e. the direction in which the strip being formed travels), there are preferably about 24 hook members per lineal inch. The hook members preferably are spaced apart laterally (i.e. in the cross machine direction) a distance 23 of about 0.008 in., and the pedestals 13 preferably have a thickness 24 of about 0.006 lineal in. This yields a density in the cross machine direction of approximately 71 fastener elements per in. Hence, there are preferably on the order of 1700 hook members per square in. in this preferred embodiment.

Figure 4:
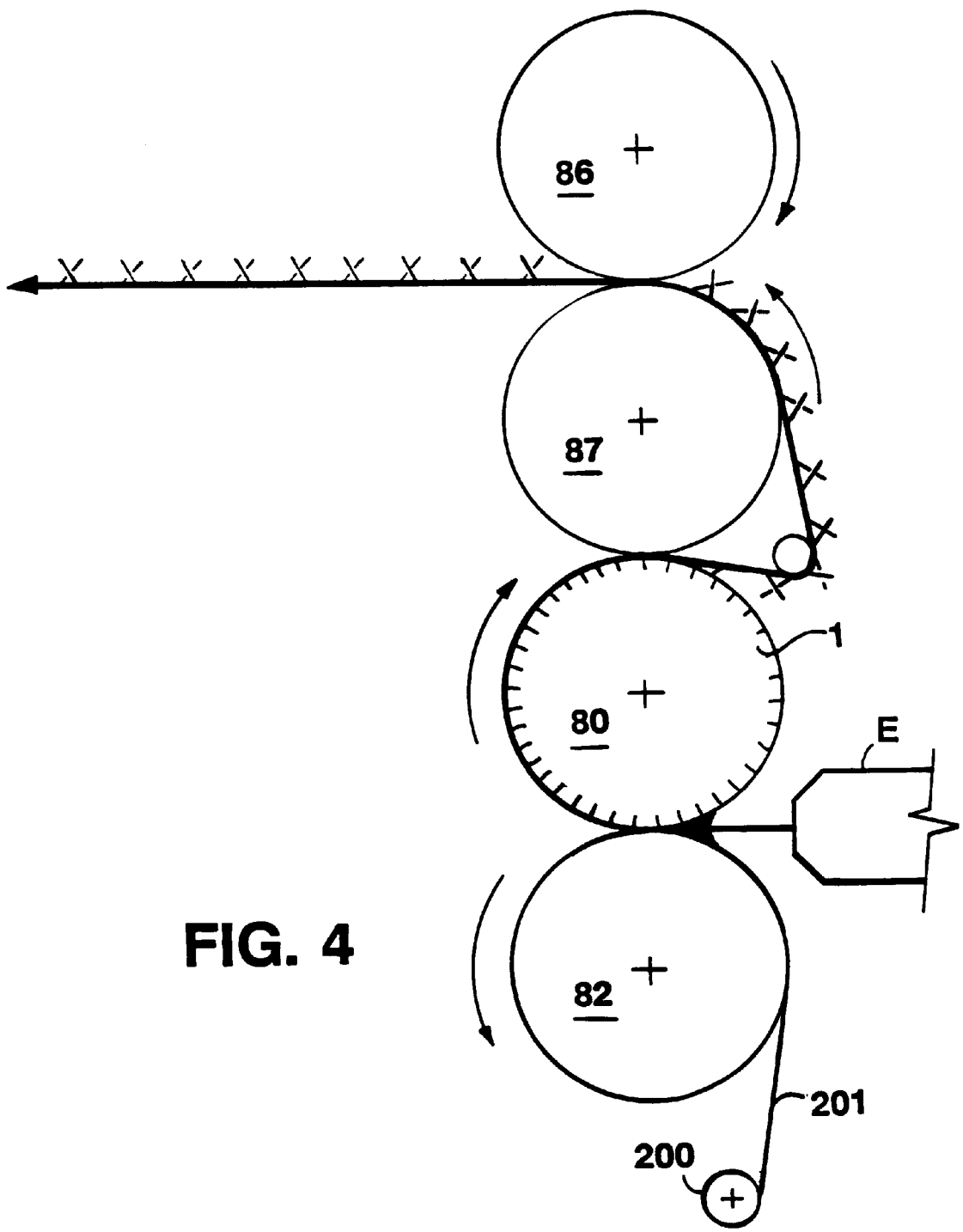
FIG. 4 is a schematic view of a system of forming hook members using a mold roll.

As shown in FIG. 4, a preferred method for making such molded hook members entails extruding molten resin into the nip formed between a cooled molding roll or roll mold 80 and a pressure-applying roll 82. The cooled molding roll has mold cavities 1 about its periphery that are configured to produce hook members. A backing sheet 201, such as a woven or non-woven fabric, may be supplied from a backing sheet roll 200 to the nip. This backing sheet may contain loops adapted to engage the hook members. The resulting fastener element will then include hook members bound to the backing sheet in what may be termed an in situ laminating process.

Referring to FIGS. 4a and 4b, the molding roll comprises a series of disc-form plates or rings 250 mounted upon a cooled central barrel 251. The rings are pressed together axially to form a cylindrical surface. Spacer rings are disposed between the tool rings. The mold cavities are disposed at the periphery of the tool rings between the spacer rings. The mold cavities and any bump or other formation cavities in the spacer ring, are provided in a predetermined relationship to provide hook members on the base in a desired relationship, as the particular application requires. As shown, the molding roll is comprised of rings. However, circular plates having molds at their periphery and cooling chambers running through the plates can also be employed.

Because the hook members face in opposite directions, the hook members in half the columns are oriented along the direction of travel of the fastener element, and the hook members in the other half of the columns are oriented opposite to the direction of travel of the fastener element. As shown in FIG. 5a, a sequence showing the removal of a hook member 12 from a mold cavity 1, the hook members that are oriented against the direction of travel can leave the mold cavities of the molding roll without significant bending. However, as shown in FIG. 5b, the hook members that are oriented along the direction of travel must bend around the edges of the mold cavities as they are extracted from the cavities. This deforms them slightly, causing them to extend higher from the base sheet and at a slightly steeper angle than the hook members that are oriented against the direction of travel. Due to the very small size of the hook members, there has been a tendency for the prior art hook members to cool and set in the deformed condition. The hook-shaped cavity disclosed, however, provides ample space for the crook to return to the shape of the cavity before the hook member is completely withdrawn from the cavity, thereby reducing the tendency of the hook to set in the deformed condition.

Furthermore, for making the two sets of hook members even more uniform, the hook members may be passed under a knock-down roller 86, the spacing of which, relative to wrap-around roller 87, is adjustable. The knock-down roller may be employed to push any higher or steeper hook members back to the same level, relative to the sheet form base, as the level of the hook members that are oriented in the opposite direction. The knock-down roller 86 is located close to the position where the hook members are withdrawn from the cavities so that the hook members are still slightly soft and permanently deformable when they pass under the knock-down roller and thus retain their new shape.

The mold cavities 1 are shown disposed at the periphery of the molding roll 80 and the moldable resin is delivered to the surface of the molding roll at a nip. It will be appreciated that the moldable resin can be delivered to the mold cavities in numerous ways.

For example, the moldable resin can be delivered to the molding roll directly from an extruder. After traveling along the surface of the molding roll, the resin is then pressed into the mold cavities using a pressure roller. In other cases, the extruder is mounted to extrude with pressure against the roll surface, with extensions of the nozzle surface that conform to the roll serving to keep the extruded resin at sufficient pressure to enable the mold cavities to fill with resin.

Other methods for delivering moldable resin to the mold cavities can also be employed. For example, referring to FIG. 4c, which is a perspective view of an injection mold showing the orientation of a mold cavity schematically, the moldable resin is injected into the mold cavities 1 which are situated on an injection mold 150, thereby forming the fastener elements by injection molding. The injection mold is formed of a series of plates 151 disposed face-to-face to create a flat (or curved) surface having mold cavities. The mold cavities can be formed in one or more plates. After molding, the overall mold opens, the hooks are withdrawn from the mold cavities as the molded piece is removed and the overall molds closes for another injection cycle. Injection molding can be employed to form the hook members directly on a rigid backing which, in turn, can be attached to a separate part. Injection molding can also be employed to form the hook members integrally with a part, such that the hook members do need to be later attached to the part.

The moldable resin may be any plastic material depending on the intended application for the fastener element. Currently, polypropylene is preferred. Nylon, polyesters, polyethylene, propylene, ethylene and copolymers thereof, or other thermoplastic resins may also be readily employed.

Other important aspects of the invention concern the making of products that employ three or more mold plates that define the mold cavities. This technique is especially useful in forming hooks by the roll molding process that have a cross machine orientation or in forming hooks that extend cross-wise to the planes of assembled plates in a stationary mold. These plates are preferably formed by use of specialized photochemical milling techniques. Alternatively, EDM techniques, laser milling or other techniques can also be employed to form the plates.

Figure 6:
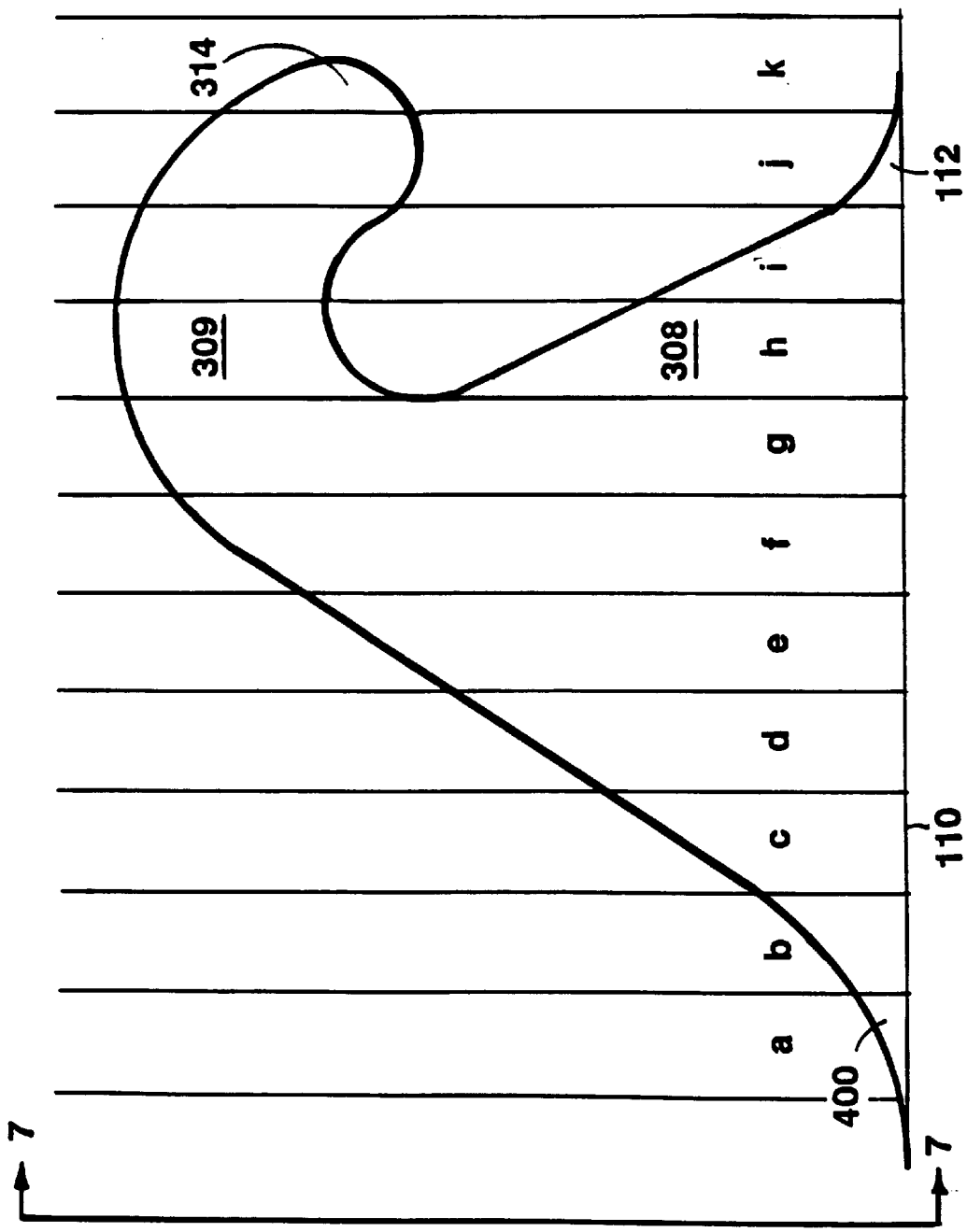
FIG. 6 is a cut-away view of a mold cavity formed by several adjacent plates.
Figure 7A:
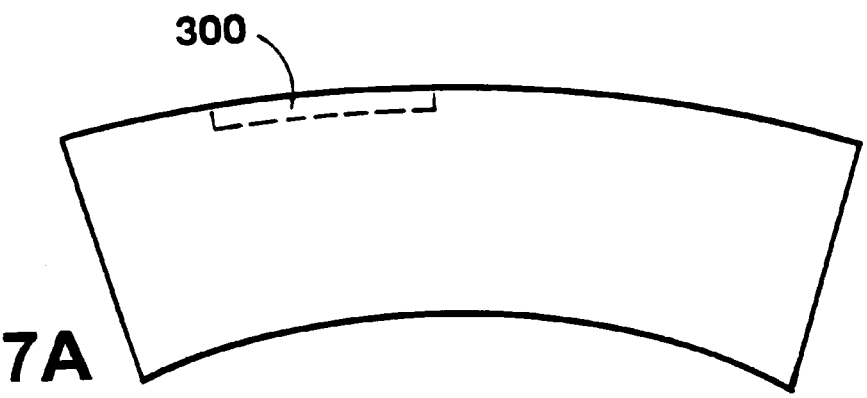
FIGS. 7a–7k are side views of sections of the plates in FIG. 6, shown diagrammatically.
Figure 7B:
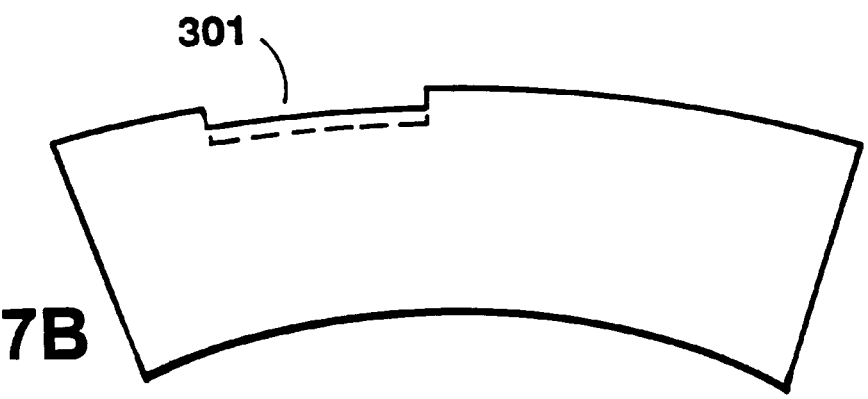
Figure 7C:
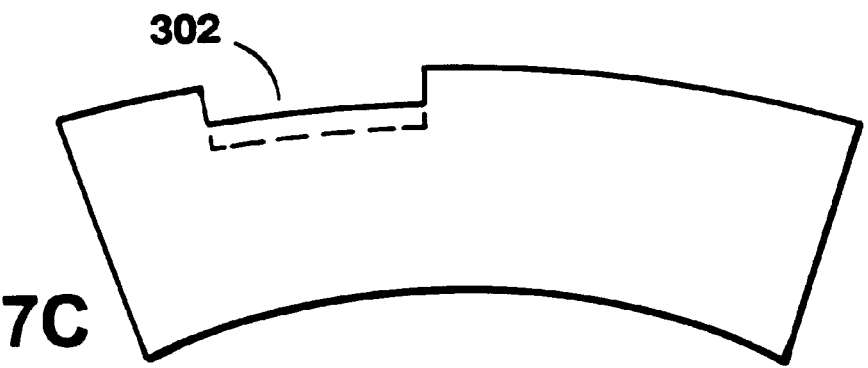
Figure 7D:
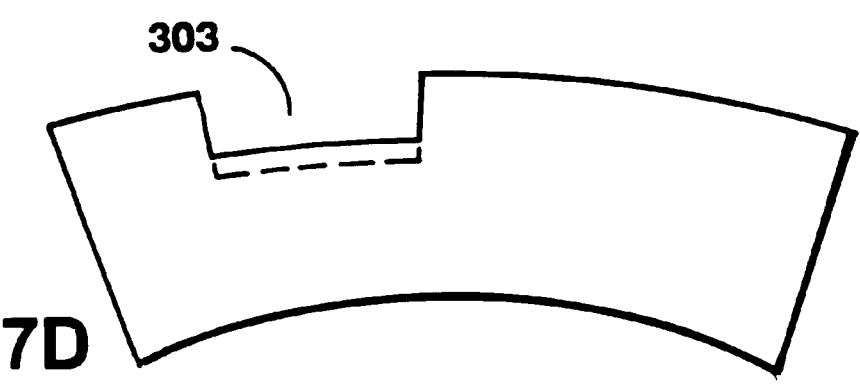
Figure 7E:
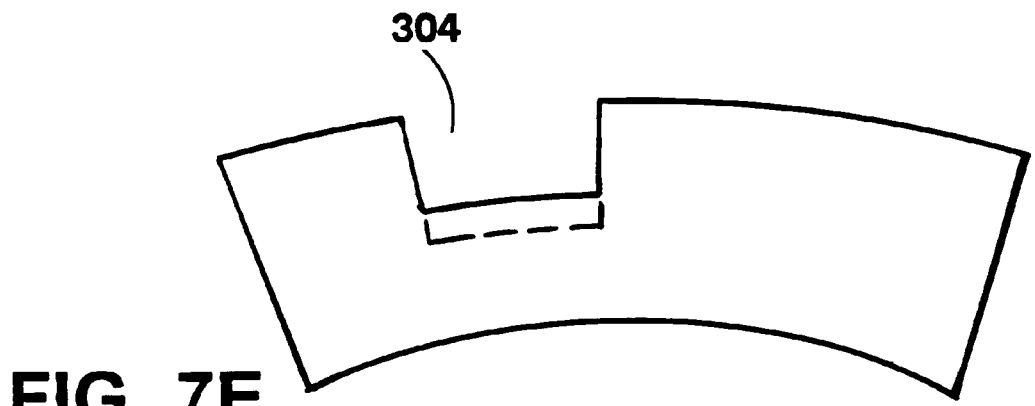
Figure 7F:
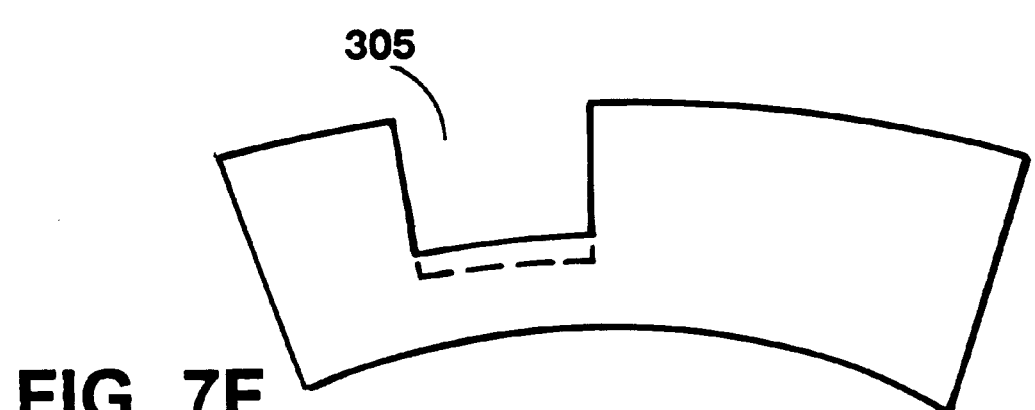
Figure 7G:
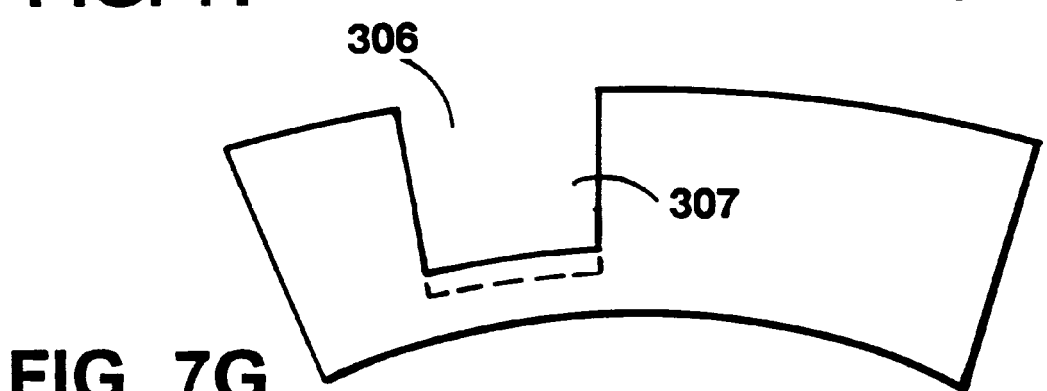
Figure 7H:
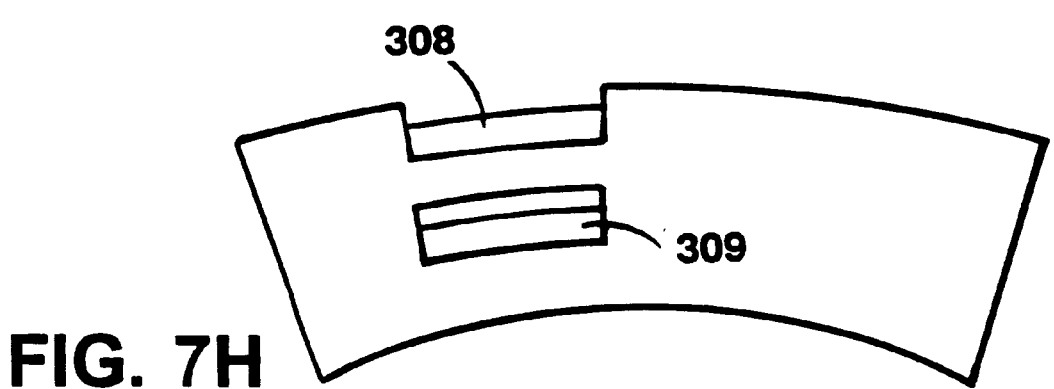
Figure 7I:
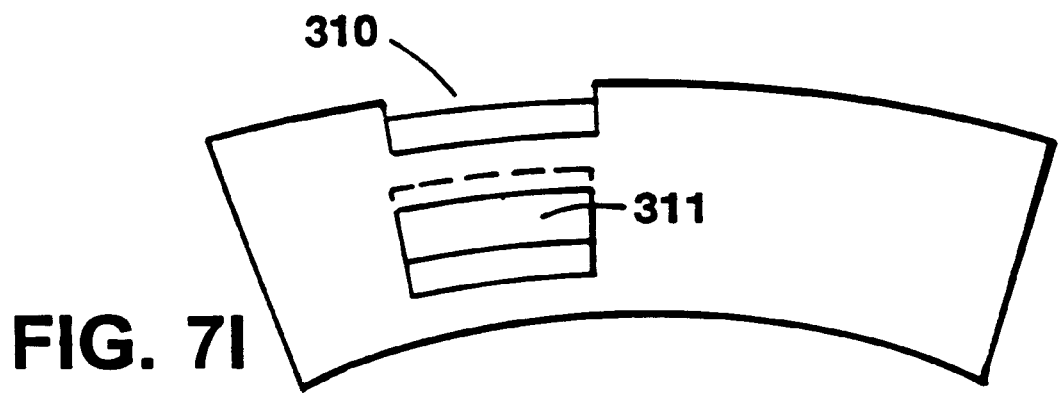
Figure 7J:
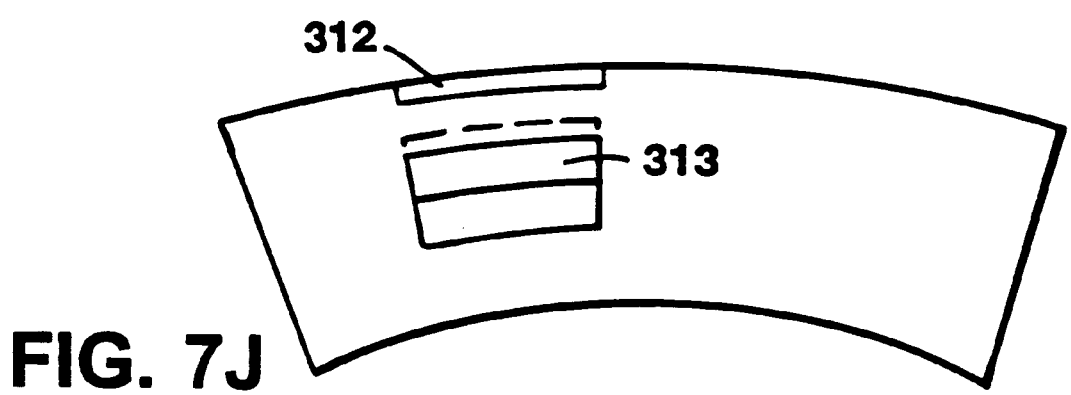
Figure 7K:
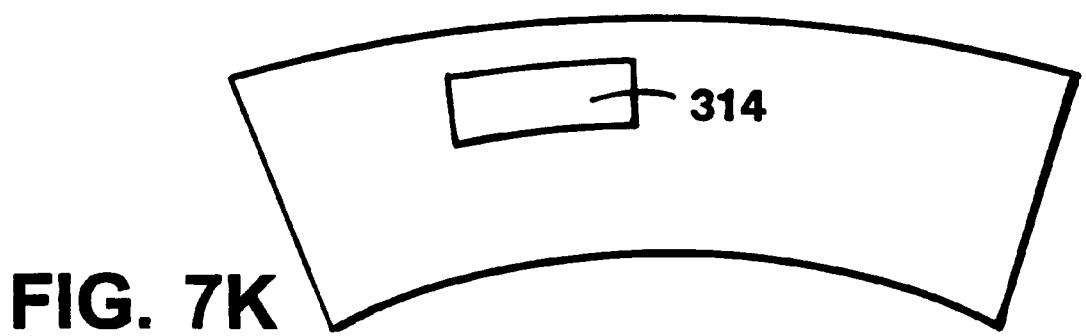

For example, FIG. 6 is a cut-away view of a molding roll through a radial plane 6—6 of FIG. 4a. Photochemical milling technology or other high accuracy forming techniques, such as laser milling, are employed to form mold cavities that extend in the cross machine direction of the molding roll. As shown, the mold cavity is hook-shaped. However, other shapes can be employed, if it is desired to form other fastener products, or even to form elements that perform other functions.

In FIG. 6, the mold cavity is formed by a plurality of stacked disk-form plates which are assembled face-to-face on the roll axis, thereby defining the surface 110 of the molding roll. Each successive plate has material removed a different amount according to slices taken of the profile of the desired mold cavity, so that only a portion of the cavity is formed in each plate. Typically part of the cavity is formed by a through aperture in one plate, while plates on each side of that plate have cavity portions in at least part of the thickness of the plate.

As shown in FIG. 6, the plates all have the same thickness. According to the invention, however, in certain advantageous implementations, the plates have differing thicknesses, based on the intended application of the hook, the desired profile or the density of the feature formed. In certain applications, the use of plates of differing thickness enables more economical fabrication since fewer plates are required to form the mold cavity. Further, the use of plates of varying thickness in other instances enables efficient definition of the mold shape, or the achievement of curved surfaces of exceedingly small radius and/or smoother transition. In important cases, as the radius curvature of a feature becomes smaller, thinner plates are employed to enable better definition of the surface.

The plates may be only 0.003 or 0.004 in. thick or less when forming small hooks. According to the invention, to enable use of very thin plates for forming special features, prior to assembling to form the mold (either a stationary mold or roll mold) one or more of the thin and delicate plates are laminated together to create a more rugged master plate that can be readily assembled on the cooled barrel without risk of distortion. The plates may be laminated by brazing, high temperature, long life bonding agents, etc.

Returning further to discuss FIG. 6, in plate h, for example, the cavity section extends through the entire thickness of the plate in the areas 308 and 309. In plate k, the cavity section extends through only a portion 314 of the thickness of the plate, to define the tip of the mold cavity.

In this approach, usually each plate is different from its neighbor and only by the stacking of the plates together is the mold cavity formed. In this way, hook members in the cross plate direction may be produced (cross-machine direction in the case of roll molding).

One can produce by this technique hook members that have flat surfaces. Advantageously, however, hook members are produced that have rounded surfaces in some or all regions, from base to tip. Advantageously, according to the invention, surfaces at the tops of the hook tips are made to taper to a point to give a wedge-shaped effect to the top of the hook member that assists the entry of the top into the face of a mating fabric.

FIGS. 7a–7k show, in diagrammatic form, a series of cut-away sections of rings that correspond with rings a–k of FIG. 6. The ring lettered a has a small section 300 of the outer edge removed, representing a section of the backside of the hook 400. The next ring, b, has cavity section 301 that forms the next section of the backside of the hook. The cavities through ring h become successively taller to form corresponding sections of the backside of the hook.

In ring h, cavity section 308 forms a section of the pedestal of the hook that is diminished in height, representing the transition toward the other side of the hook. Cavity section 309 forms the beginning of the top of the crook.

In the next ring, i, the cavity section 310 is diminished to represent the pedestal becoming shorter while cavity section 311 forms the part of the crook that progresses downward.

At ring j, cavity section 312 is the last section of the pedestal and cavity section 313 approaches the tip of the crook. Finally, in ring k, cavity section 314 forms the actual tip of the hook. Since there is no portion of the pedestal formed by ring k, there is only one cavity section in this plate.

The techniques described enable one to optimize the shape of the selected areas, especially in section h, i, j and k. FIGS. 8a and 8b thus shows an alternate way of creating a mold cavity that, according to a further aspect of the invention, is achieved by photochemical milling. The cavity sections 300–314 in FIG. 7, have straight sides which produce a hook member with flat sides; by changing to curved sides as in FIGS. 8a and 8b, as a result of the inherent tendency of photochemical milling to form curved surfaces, a hook member is created that has curved sides rather than flat sides. As the crook is approached in plate H', the cavity section 309' not only has curved sides, but it has a point to produce a crook of wedge form at its top.

Figure 9A:
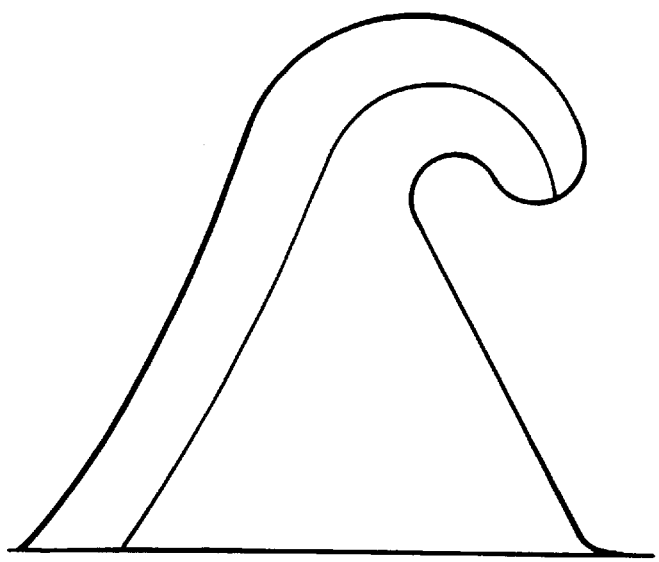
FIGS. 9a and 9b are side and end views, respectively, of a hook member having a wedge at the top.
Figure 9B:
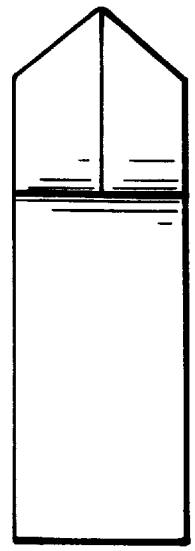

FIGS. 9a and 9b show a hook in which the top of the crook is wedge shaped, created by the cavity sections 309' such as illustrated in FIG. 8b. The top of the hook member thus has a two-sided wedge effect to separate the fibers or the filaments of the mating fabric and allow the hook member to penetrate the surface and subsequently engage better into the loops or with the fibers.

Figure 10C:
Figure 10A:
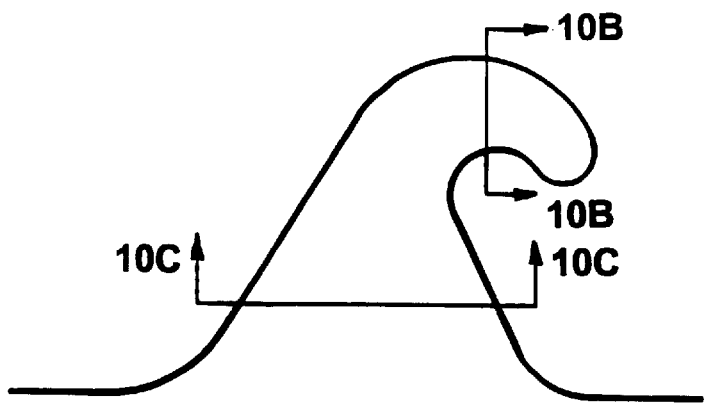
FIG. 10a is a side view of a hook member having a curved side.
Figure 10B:

FIGS. 10a, 10b and 10c show a hook member which is formed by milling the hook shape by photochemical milling techniques into one ring and defining the cavity with the milled ring and a flat ring. The hook member is curved on one side and flat on the other. Consequently, a one-sided wedge is formed at the top of the hook member to better penetrate loops.

The techniques just described, of creating curved surfaces to the hooks to form top wedges or smooth non-abrading surfaces, are applicable to formation of hooks that extend, as desired, in either the direction of the plate (machine direction for roll molds) or in the cross plate (cross-machine direction for roll molds).

An advantage of making hook members in the manner just described, in which the hook member is aligned in the cross machine direction of the molding roll concerns the manufacture items of apparel. A tape of conventional hook form is often employed in an orientation that does not point the hooks in the optimum orientation. Molding hooks in a cross machine direction, for such cases, enables the points of the hooks on the tape to point in the direction to optimize the engagement into the loops or with the fibers.

The sectioned technique described with respect to FIGS. 6–8, advantageously enables hooks of different size and shape to be created which vary along the length of the product to accommodate the conditions of various parts of the use of the fastener. Advantageously, the hook sizes and shapes are likewise varied around the circumference of the tooling as suggested in FIG. 10. Likewise, in certain advantageous circumstances, the sizes of the hooks are varied in-the machine direction. Thus one achieves hooks of different sizes extending in both directions, interspersed with each other, according to a predetermined pattern. In certain implementations, adjacent hooks lie at 90 degrees to each other in a repetitive pattern in both directions. Also, according to predetermined patterns, machine direction hooks are alternated with cross machine direction hooks to reduce the sensitivity of the product to orientation.

Figure 11A:
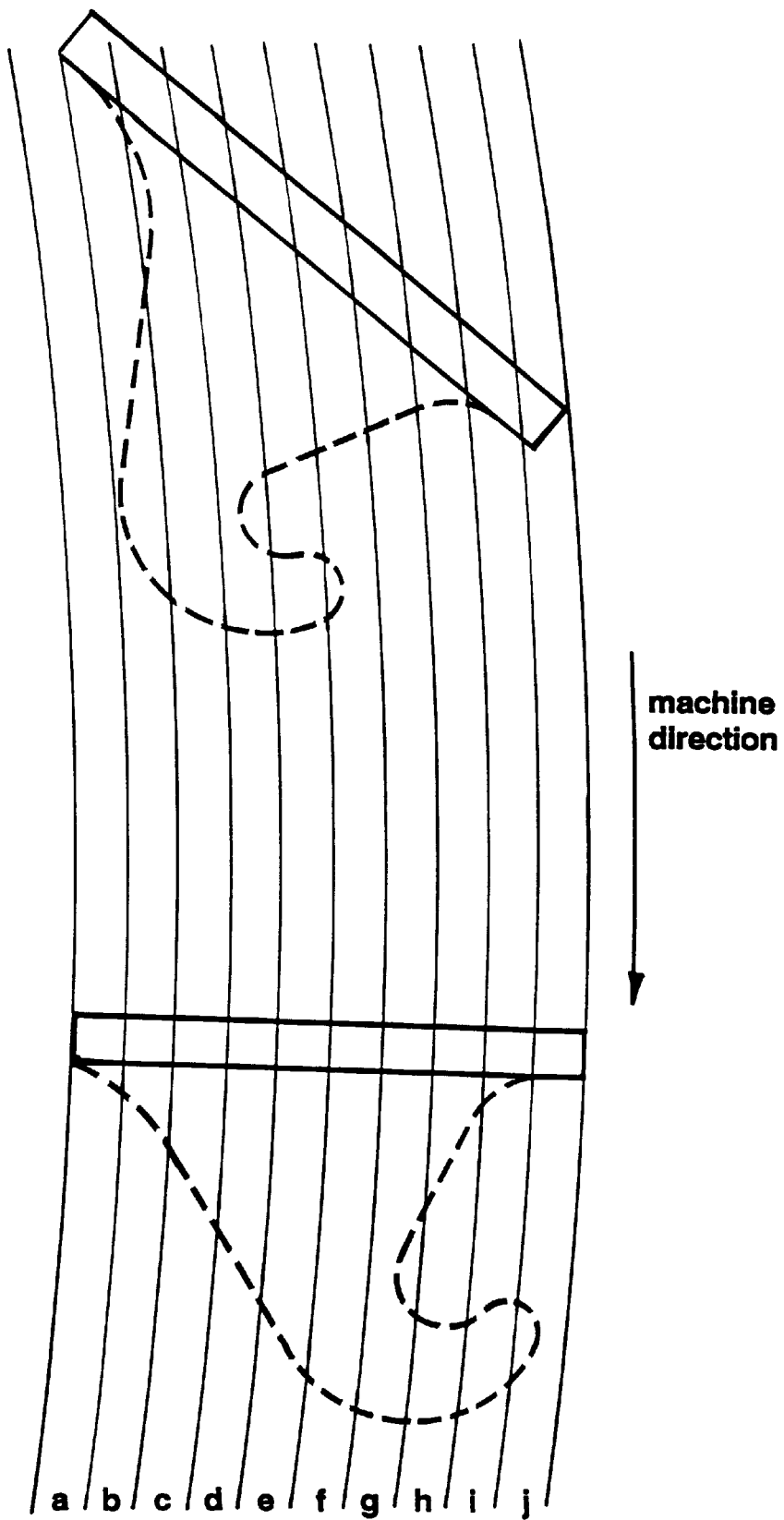
FIGS. 11a and 11b are diagrammatic, perspective views of the surface of a section of a mold roll depicting mold cavities having various orientations with respect to machine direction.
Figure 11B:
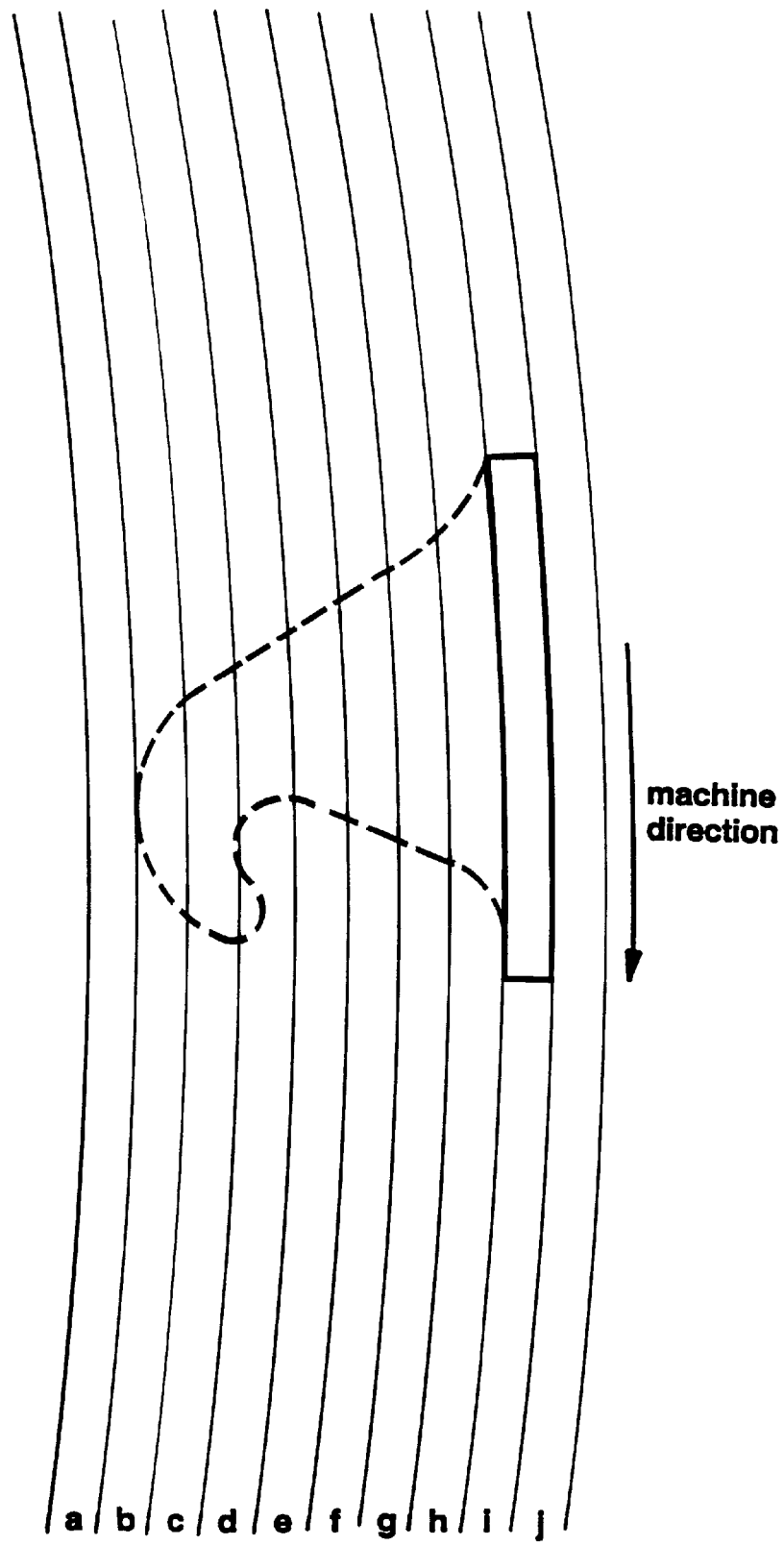
Figure 13:
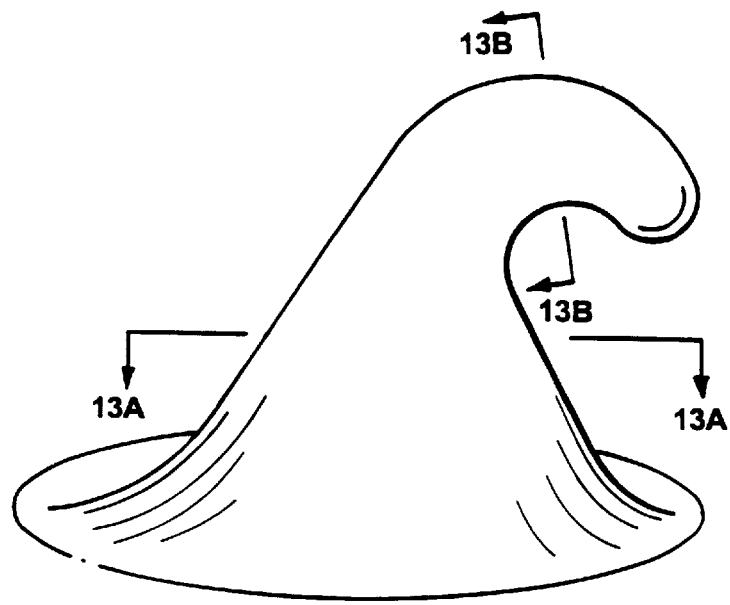
FIG. 13 is a prospective view of a hook member having a circular cross-section.
Figure 13A:
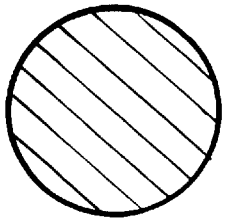
FIGS. 13a and 13b are cross-sectional views of the hook member shown in FIG. 13.
Figure 13B:
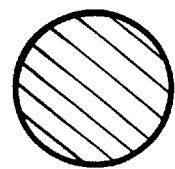
Figure 14:
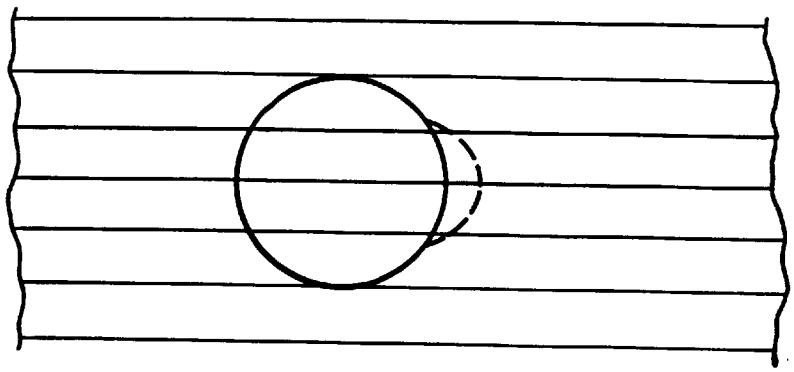
FIG. 14 is a plan view of a mold cavity used to form the hook member of FIG. 13.

Using the techniques just described, the invention also enables hooks to run at an angle relative to the cross machine and machine direction, i.e. in a helical or biased configuration such that a component of the projection of the hook member extends in the cross machine direction and in the machine direction. For instance, in certain embodiments, rings are formed such that the hooks extend at an angle of 45 degrees to the machine direction if that is needed. FIGS. 11a and 11b which are perspective views of a section of the surface of a mold roll showing the location and orientation of mold cavities schematically illustrate these various orientations. Like orientations (with-the-plate, and cross-the-plates orientations) are achieved for fixed molds, according to the invention.

The present techniques therefore enable practical manufacture of hooks (including hooks with multiple crooks) having various orientations (i.e., components of the hook extending in the cross machine direction) and patterns relative to the machine direction of the molding roll. Palm tree hooks (dual hooks), trident hooks (three hooks) and quadra hooks (four hooks fasteners) are made feasible according to the techniques described here.

The molding action of the hook shown in FIG. 6 will now be described. In FIG. 6, the same profile that has previously been described in FIG. 1 is shown, except that it has been rotated 90 degrees relative to the machine direction.

The pedestal base is wide, to allow the hook to demold and spring back to its original shape before it clears the pedestal cavity, to reduce distortion, as described above. A further feature of the design is that a wide pedestal also is provided in the machine direction. This effectively produces a pedestal that is broad both in the crook direction and at 90 degrees to the crook direction, effectively forming a true pyramid pedestal that tapers in on all four sides.

Figure 12:
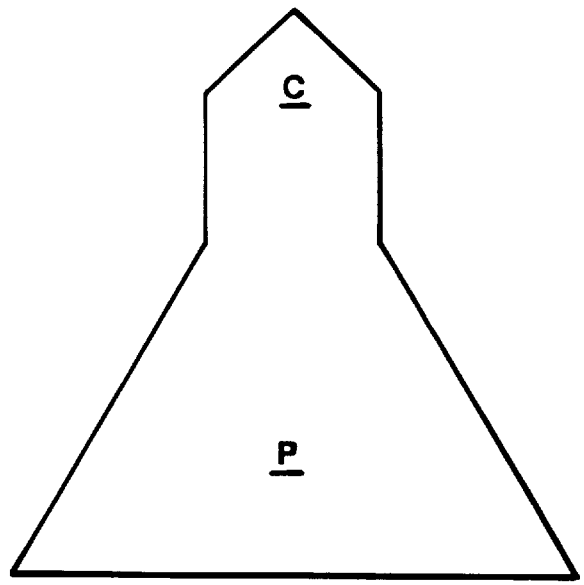
FIG. 12 is an end view of a hook member having a taper running 90° to the profile direction.

FIG. 12 is the end view of a hook member mold employing the section cavities of FIG. 8, but having tapers running 90 degrees to the profile direction (i.e., in end view). In certain advantageous instances, the taper rate is 0.6 to 1, 0.8 to 1 or more. In certain advantageous instances, the taper in end view matches the taper in side profile, about 1.2. This provides a very substantial pedestal which enables the hook member to perform well because it is sturdy and well anchored. Of course, other profiles are made possible by the invention.

The taper shown in FIG. 12 also enables the hooks to be readily demolded. According to the invention, tapers of the pedestal are selectable that simultaneously enable demolding of cross machine hooks, provide a large pedestal cavity for the crook of the hook member to snap back to molded shape as demolding progresses, and provide hooks that are very strong relative to their small overall height.

In addition to enabling production of a pedestal with tapers in both machine and cross machine direction, according to another aspect of the invention, the techniques are employed to introduce curved surfaces and to create a molded pedestal that is of cone shape as shown in FIGS. 13, 13a, 13b and 14. The conical shape provides a sturdy hook, but with smooth surfaces that in important instances enable the avoidance of abrasion that sharp corners or flat surfaces produce.

Round surfaces of the hook members also in certain circumstances reduce fatigue fracture at sharp corners. Without sharp corners, such hooks may return to their original shape during disengagement because they do not so readily suffer fatigue. Also such rounded hooks are capable of an increased number of cycles of fastening and unfastening before failure.

Special photochemical milling techniques have novel use in forming the numerous microhooks described above or submicrohooks to now be described of conventional and cross orientation.

In the making of a mold for the hook profile shown in FIG. 6, according to this aspect of the invention, photochemical milling techniques are employed. For a given plate, a piece of flat sheet stock is selected from which the mold cavity or cavity section is to be formed. In the case of a roll mold or molding roll, the sheet stock is sized to form a component disk of the molding roll. The material may be 17-7 Ph stainless steel or other suitable metal. A photosensitive media, i.e. a positive photoresist material, is applied over the plate and is exposed to a light source through a compensating mask so that the photoresist will be removed where it is desired, to enable photochemical milling to remove metal to form the mold cavity. The mask blocks a predetermined portion of the light so that the photoresist material is exposed to a predetermined pattern of light. The mask positioned between the light'source and the photoresist material. In particular, the mask may be applied directly to the photoresist material.

Currently, the photoresist material is preferably a positive photoresist material. When exposed to light, the positive photoresist material cures onto the plate. The remaining portion of the photoresist material which was not exposed to light is then removed. Alternatively, a negative photoresist material may be employed. When exposed to light, the negative photoresist material is "burned" away. The remaining portion of the photoresist material which was not exposed to light remains on the plate.

In FIG. 15, the mask is shown in dashed lines, superposed over the profile of the desired hook shaped cavity, shown in solid lines. The portion of the photoresist that is to be removed is within the dashed lines. After the photoresist is exposed to the light, the photoresist is washed away to expose the pattern of the art work. Then the metal sheet is placed in a machine, and the metal not covered by the photoresist material is removed by action of acid. Spray of acid is employed, as is conventional in photochemical milling. After milling, the portion of the metal plate covered by the photoresist layer remains. (As is known in the field, positive or negative photoresist material may be employed to form the photoresist layer, positive resist being presently preferred where extremely small features are being produced.)

With respect to FIG. 15, regions A–G designate different portions of the shape of the cavity and, diagrammatically, of the compensating mask. In some regions, the dashed line of the compensating mask and the edge of the desired cavity generally correspond, while in other regions they do not.

For straight line regions, e.g. region B in FIG. 15, the edge of the compensating mask generally corresponds to the straight line of the cavity profile that is desired (the shallower the mill depth, the closer the correspondence). However, in curved regions, the lines of the mask diverge more substantially from the desired profile. The more radical the curvature is, the greater is the difference between the mask and the desired profile. In areas where the curve of the desired cavity edge is convex, such as at A in FIG. 15, the compensation is to opposite effect to the compensation where the curvature is concave, as at C in FIG. 15. In general, in convex regions of the final edge, as at A, the compensating mask undersizes the cavity because the action of the acid will be relatively concentrated for a given length of perimeter being milled, relative to what occurs for a straight line portion.

On concave surfaces, as at C, the opposite is true and the art work of the compensating mask is enlarged to compensate in the opposite way. Moving to region E in FIG. 15, in this case the convexity of the surface is greater than in region A, i.e. has a smaller radius, and therefore the compensation is greater, providing more undersizing of the cavity defined by the mask.

The art work of the compensating mask defines points in the regions D and E. The tendency in photochemical milling is for sharp corners to be rounded. In this case, since a small rounded tip shape is desired, the compensated art work comes to quite a sharp point. Region F is a straight line, similar to region B, and region G corresponds to region A. Thus the hook cavity profile for all regions of curvature in the art work of the compensating mask in this example is different from the actual design of the desired hook cavity.

FIG. 15a shows a cross section of the metal after action of the acid in which advantage is taken of the tendency in the photomilling process to produce a curved rather than a straight surface due to the nature of the action of the acid. The general principle is that at sharp edges, the process will produce a rounding of the edge surface. This is found to generate a desirable rounded shape, particularly at the edge of the top of the hook. The rounded shape provides a surface that can more readily penetrate the surface of a mating fabric than a flat surface. Further, in important instances, the naturally rounded shape of the surface of the milled plate is exploited to create a smooth curve extending along several adjacent plates.

Selection of the particular compensating techniques for the art work, the photoresist materials, and the acid depend upon the particular metal being exposed, the depth of metal removal and other conditions, as is well known in the art of photochemical machining. For general reference, see for instance: technical paper 1976 Society of Manufacturing Engineers, entitled "Photo-Chemical Machining Fundamentals—With Three Unique Applications" by Dr. R. J. Bennett; and publication Photo Chemical Machine Institute, publication no. PCMI1000, entitled "What is Photo Chemical Machining Process and What Can It Do For You?"; to conference proceedings of The Society of Carbide and Tool Engineers cosponsored by Medicut Research Associates, Inc and Abrasive Engineering Society, entitled "Nontraditional Machining Conference Proceedings of the Conference Held Dec. 2 and 3, 1985"; and to the references cited in those papers.

FIG. 16 illustrates an alternative compensating mask in which the straight lines and sharp corners are used to provide smooth, small radius surfaces in the produced part. The art work is shaped as small squares near the tip of the hook where a smooth radius of one curvature transitions into a smooth radius of the opposite curvature.

Various techniques are employed to obtain different desired profiles on the plates. For example, in producing cavities or cavity sections that extend through the plates, the plates are advantageously photochemically milled from both sides, thereby reducing the total concavity of the milled surface, and, in certain instances where desired, providing overall convex surface. In certain advantageous instances, the sides of the plate are exposed to the acid conditions for different amounts of time, that create different shapes at the opposite sides of the plate. The acid liquid is preferably directed in a stream at portions of the plate, that increase its effectiveness.

Referring to FIG. 17b, a hook element according to FIGS. 2a–d is provided having an overall height H of 0.008 in. The radius of the tip surface is approximately 0.0008 in. This hook is shown for comparison next to a microhook in FIG.

17a, having height H of 0.015 in., described earlier. Because it is diminutive (height less than 0.010 in.) we refer to the hook of FIG. 17b as a "sub-microhook". It has been advantageously formed in different instances by photochemical milling into the side of a plate to a depth of 0.003 in. and 0.005 in, The hook element of FIG. 17c is of similar configuration except that the projection of the crook is not as great and the top of the crook extends essentially horizontally. This profile represents a different trade off in respect of displacement volume and hook shape that is appropriate in certain circumstances. The displacement volume of the hook member of FIG. 17c is less than that of FIG. 17b because it omits the downward projection of the tip. This form of hook is considered to be useful e.g. with nonwoven fabrics in which the fibers are tightly bound to the material and present little loft. When employed in close association with rows of hook elements pointing in the opposite direction, the hooks of FIG. 17c provide effective engagement in certain instances.

Other embodiments are within the scope of the following claims.

What is claimed is:

1. For a touch fastener having an array of hook members integrally formed with a common base, a molded hook member capable of engaging loops of a mating material, the molded hook member comprising:

a broad-based, tapered pedestal portion integrally formed with and extending upwardly from the base, and a tapered crook portion integrally formed with and arching along a curved axis directly from the pedestal portion to a loop-engageable tip, the pedestal and crook portions together tapering continuously from the base to the tip, the rate of taper of the pedestal portion being sufficient to provide, within a fixed cavity in which the hook member is formed, space for substantially complete shape recovery of the crook portion of the hook member before the molded hook member is completely removed from the cavity;

in side profile, the pedestal portion having upwardly extending leading and trailing edges that slope inwardly toward each other at similar angles to a normal to the base to define a truncated, broad-based pyramid, wherein projections of the leading and trailing edges intersect in the vicinity of a point of the hook most distant from the base, and wherein at least 40% of the crook portion projects laterally from the pedestal portion.

2. The molded hook member of claim 1 wherein the projections of the leading edge and the trailing edge intersect at an angle greater than about 40 degrees.

3. The molded hook member of claim 2 wherein the projections of the leading edge and the trailing edge intersect at an angle greater than about 50 degrees.

4. The molded hook member of claim 1 having a height, as measured from the base, of less than about 0.020 inch; and a thickness of no more than about 0.006 inch.

5. The molded hook member of claim 1 wherein the displacement volume of the crook portion is less than $0.5 \times 10^{-6}$ cubic inch.

6. The molded hook member of claim 1 wherein the pedestal portion tapers at a taper rate of at least 0.6 to 1 from the base to a half-height elevation equally spaced from the base and the point most distant from the base.

7. The molded hook member of claim 6 wherein the taper rate is at least 0.8 to 1.0.

8. The molded hook member of claim 1 having an overall height of less than about 0.015 inch.

9. The molded hook member of claim 1 having an overall height of less than about 0.010 inch.

10. The molded hook member of claim 1 wherein the leading and trailing edges define therebetween an apex angle of at least 40 degrees.

11. The molded hook member of claim 10 wherein the apex angle is at least 50 degrees.

12. The molded hook member of claim 11 wherein the apex angle is at least 60 degrees.

13. The molded hook member of claim 1 wherein the pedestal portion has broad sides that taper inwardly, in end view, from the base to the crook portion.

14. The molded hook member of claim 1 wherein the crook portion is wedge-shaped in end view.

15. For a fastener having an array of hook members integrally formed with a common base, a hook member capable of engaging loops of a mating material, the hook member comprising:

a tapered pedestal portion integrally formed with and extending upwardly from the base to a single tapered crook portion arching along a curved axis and extending upwardly in a crook direction directly from the pedestal portion to a loop-engageable tip extending toward the base, the pedestal and crook portions together tapering continuously from the base to the tip, the pedestal portion being of sufficient size with respect to the crook portion that a shape having the same dimensions as a side profile of the crook portion, when superimposed over a side profile of the pedestal portion, fits entirely within the side profile of the pedestal portion.

16. The molded hook member of claim 15 wherein the displacement volume of the crook portion is less than $0.5 \times 10^{-6}$ cubic inch.

17. The molded hook member of claim 15 wherein the tip is curved down generally in the direction of the base.

18. The molded hook member of claim 17 in which the pedestal portion has a thickness of no more than about 0.006 inch.

19. A touch fastener for engaging loops to form a fastening, the fastener comprising:

a base; and an array of hook members integrally formed with and extending from a surface of the base, each hook member comprising a broad-based, tapered pedestal portion integrally formed with and extending upwardly from the base, and a tapered crook portion integrally formed with and arching along a curved axis directly from the pedestal portion to a loop-engageable tip, the pedestal and crook portions together tapering continuously from the base to the tip, the rate of taper of the pedestal portion being sufficient to provide, within a fixed cavity in which the hook member is formed, space for substantially complete shape recovery of the crook portion of the hook member before the molded hook member is completely removed from the cavity;

in side profile, the pedestal portion having upwardly extending leading and trailing edges that slope inwardly toward each other at similar angles to a normal to the base to define a truncated, broad-based pyramid, wherein projections of the leading and trailing edges intersect in the vicinity of a point of the hook most distant from the base, and wherein at least 40 percent of the crook portion projects laterally from the pedestal.

20. The touch fastener of claim 19 wherein the hook members of the array are arranged in a density of at least 1200 hook members per square inch.

21. The touch fastener of claim 19 wherein the hook members are arranged in parallel rows, with the crook portions of the hook members projecting along the rows, the array having a lineal hook member density of at least 60 hook members per inch in a direction perpendicular to the rows.

22. The touch fastener of claim 19 wherein the leading and trailing edges of the pedestal portions of each hook member define therebetween an apex angle of at least 40 degrees.

23. The touch fastener of claim 22 wherein the apex angle is about 60 degrees.

24. The touch fastener of claim 19 wherein the pedestal portion of each hook member has broad sides that taper inwardly, in end view, from the base to the crook portion of the hook member.

25. The touch fastener of claim 19 wherein the crook portion of each hook member is wedge-shaped in end view.

26. For a touch fastener having an array of hook members integrally formed with a common base, a molded hook member capable of engaging loops of a mating material, the molded hook member comprising:
   a broad-based, tapered pedestal portion integrally formed with and extending upwardly from the base, and a tapered crook portion integrally formed with and arching along a curved axis directly from the pedestal portion to a loop-engageable tip;
   in side profile, the pedestal portion having upwardly extending leading and trailing edges that slope inwardly toward each other to define a truncated, broad-based pyramid, wherein the height ($P_1$) of the pedestal at which the pedestal width ($W_P$) is equal to the width of the crook portion ($W_c$), is greater than 30% of the total height of the pedestal ($H_P$).

27. The molded hook member of claim 26 wherein projections of the leading edge and the trailing edge intersect at an angle greater than about 40 degrees.

28. The molded hook member of claim 27 wherein the projections of the leading edge and the trailing edge intersect at an angle greater than about 50 degrees.

29. The molded hook member of claim 26 having a height, as measured from the base, of less than about 0.020 inch and a thickness of no more than about 0.006 inch.

30. The molded hook member of claim 26 wherein the crook portion has a displacement volume of less than about $0.5 \times 10^{-6}$ cubic inch.

31. The molded hook member of claim 26 wherein the tip is curved down generally in the direction of the base.

32. The molded hook member of claim 26 in which the pedestal portion has a thickness of no more than about 0.006 inch.

33. The molded hook member of claim 26 having an overall height of less than about 0.015 inch.

34. The molded hook member of claim 26 having an overall height of less than about 0.010 inch.

35. For a touch fastener having an array of hook members integrally formed with a common base, a molded hook member capable of engaging loops of a mating material, the molded hook member comprising:
   a broad-based, tapered pedestal portion integrally formed with and extending upwardly from the base, and a tapered crook portion integrally formed with and arching along a curved axis directly from the pedestal portion to a loop-engageable tip;
   in side profile, the pedestal portion having upwardly extending leading and trailing edges that slope inwardly toward each other to define a truncated, broad-based pyramid, wherein the hook member has a predetermined total height (H), and at half that height (H/2) the pedestal portion has a width ($W_P$) approximately equal to half the total height (H/2).

36. The hook member of claim 35 wherein projections of the leading edge and the trailing edge intersect at an angle greater than about 40 degrees.

37. The hook member of claim 35 wherein the projections of the leading edge and the trailing edge intersect at an angle greater than about 50 degrees.

38. The hook member of claim 35 wherein the total height (H) is less than about 0.020 inch and the hook member has a thickness of no more than about 0.006 inch.

39. The hook member of claim 35 wherein the crook portion has a displacement volume of less than about $0.5 \times 10^{-6}$ cubic inch.

40. The hook member of claim 35 wherein the pedestal portion has flat sides.

41. The hook member of claim 35 wherein the pedestal portion has a thickness of no more than about 0.006 inch.

42. The hook member of claim 35 wherein the total height (H) is less than about 0.015 inch.

43. The hook member of claim 35 wherein the total height (H) is less than about 0.010 inch.

* * * * *

UNITED STATES PATENT AND TRADEMARK OFFICE
CERTIFICATE OF CORRECTION

PATENT NO.    : 6,131,251
DATED         : OCTOBER 17, 2000
INVENTOR(S)   :

It is certified that error appears in the above-identified patent and that said Letters Patent is hereby corrected as shown below:

Column 1, lines 55-57, delete "for making the hooks and other products, improved techniques for making the molds".

Column 5, line 7, delete "c rook" and add –crook–.

Column 5, line 62, delete "us" and add –used–.

Column 13, line 18, after "light", delete –'–.

Signed and Sealed this

Fifteenth Day of May, 2001

NICHOLAS P. GODICI

Attest:

Attesting Officer    Acting Director of the United States Patent and Trademark Office